US011367201B2

(12) United States Patent
Troy et al.

(10) Patent No.: US 11,367,201 B2
(45) Date of Patent: Jun. 21, 2022

(54) SYSTEM AND METHOD FOR CONTINUAL LOCALIZATION OF SCANNER USING NON-DESTRUCTIVE INSPECTION DATA

(71) Applicant: The Boeing Company, Chicago, IL (US)

(72) Inventors: James J. Troy, Issaquah, WA (US); Gary E. Georgeson, Tacoma, WA (US); Joseph L. Hafenrichter, Seattle, WA (US)

(73) Assignee: The Boeing Company, Chicago, IL (US)

( * ) Notice: Subject to any disclaimer, the term of this patent is extended or adjusted under 35 U.S.C. 154(b) by 344 days.

(21) Appl. No.: 16/580,207

(22) Filed: Sep. 24, 2019

(65) Prior Publication Data

US 2021/0090269 A1    Mar. 25, 2021

(51) Int. Cl.
*G06T 7/246*   (2017.01)
*G01D 5/00*    (2006.01)

(52) U.S. Cl.
CPC .............. *G06T 7/248* (2017.01); *G01D 5/00* (2013.01)

(58) Field of Classification Search
CPC .......... G06T 7/248; G01D 5/00; G01D 21/02; G01N 29/043; G01N 29/0654; G01N 29/225; G01N 29/265; G01N 2291/106; G01S 7/52036; G01S 7/52079; G01S 15/8915; G01S 15/8945; G01B 21/04; G01B 7/004; G01B 11/002; G01B 17/00
See application file for complete search history.

(56) References Cited

U.S. PATENT DOCUMENTS

| 7,743,660 | B2 | 6/2010 | Marsh et al. |
| 8,453,928 | B2 | 6/2013 | Melandso et al. |
| 8,738,226 | B2 | 5/2014 | Troy et al. |

(Continued)

FOREIGN PATENT DOCUMENTS

EP    2183544 A1    5/2010

OTHER PUBLICATIONS

Extended European Search Report dated Jan. 28, 2021, in European Patent Application No. 20192912.2 (European counterpart of the instant U.S. patent application).

(Continued)

*Primary Examiner* — Michael P Nghiem
*Assistant Examiner* — Dacthang P Ngo
(74) *Attorney, Agent, or Firm* — Ostrager Chong Flaherty & Broitman P.C.

(57) ABSTRACT

Systems and methods for tracking the location of a non-destructive inspection (NDI) scanner using scan data converted into images of a target object. Scan images are formed by aggregating successive scan strips acquired using one or two one-dimensional sensor arrays. An image processor constructs and then compares successive partially overlapping scan images that include common features corresponding to respective structural features of the target object. The image processor is further configured to compute a change in location of the NDI scanner relative to a previous location based on the respective positions of those common features in the partially overlapping scan images. This relative physical distance is then added to the previous (old) absolute location estimate to obtain the current (new) absolute location of the NDI scanner.

20 Claims, 16 Drawing Sheets

(56) References Cited

U.S. PATENT DOCUMENTS

| | | | |
|---|---|---|---|
| 8,744,133 B1 | 6/2014 | Troy et al. | |
| 8,880,340 B2 | 11/2014 | Erignac et al. | |
| 8,892,252 B1 | 11/2014 | Troy et al. | |
| 9,470,658 B2 | 10/2016 | Troy et al. | |
| 9,689,844 B2 | 6/2017 | Holmes et al. | |
| 9,915,633 B2 | 3/2018 | Georgeson et al. | |
| 9,933,396 B2 | 4/2018 | Fetzer et al. | |
| 10,168,287 B2 | 1/2019 | Georgeson et al. | |
| 10,209,223 B2 | 2/2019 | Kollgaard et al. | |
| 2015/0130928 A1* | 5/2015 | Maynard | G01C 15/002 348/135 |
| 2015/0369909 A1* | 12/2015 | Lasser | G01N 29/265 367/7 |

OTHER PUBLICATIONS

Besl et al., "A Method for Registration of 3-D Shapes", IEEE Trans. on Pattern Analysis and Machine Intelligence, vol. 14, No. 2, Feb. 1992, pp. 239-256.

* cited by examiner

SYSTEM AND METHOD FOR CONTINUAL LOCALIZATION OF SCANNER USING NON-DESTRUCTIVE INSPECTION DATA

BACKGROUND

This disclosure generally relates to systems and methods for tracking the location of a scanner as it moves over a target area (e.g., a surface of a target object). In particular, this disclosure relates to systems and methods for tracking the location of a non-destructive inspection scanner (hereinafter "NDI scanner"). As used herein, the term "location" includes position in a coordinate system and orientation relative to that coordinate system.

Various types of imagers may be utilized to perform non-destructive inspection (NDI) on target objects. One or more imagers may move over the portion of the structure to be examined, and acquire scan image data representing characteristics or features (e.g., boundaries of objects or surfaces) of the structure. For example, a pulse-echo, thru-transmission, or shear wave sensor may be utilized to obtain ultrasonic data, such as thickness gauging, detection of laminar defects and porosity, and/or crack detection in the structure. Resonance, pitch/catch or mechanical impedance sensors may be utilized to provide indications of voids or porosity, such as in adhesive bondlines of the structure. In addition, single and dual eddy current sensors impart and detect eddy currents within a structure to provide data for detecting cracks and/or corrosion, particularly in metallic and other conductive structures.

As used herein, the term "sensor data" means analog data acquired by a sensor array, which may be part of an NDI scanner that additionally includes a digital signal processor. As used herein, the term "scan image data" means digital data in the form of a 2-D matrix of pixel values (hereinafter "pixels") derived from sensor data. For example, a one-dimensional (linear) sensor array may be scanned over a surface to acquire respective analog sensor data which is converted to a corresponding 2-D matrix of pixels representing an image (hereinafter "scan image") of the subsurface structure of the scanned portion of a target object.

Some existing solutions for inspecting a structure include motion platforms (e.g., robotic crawler vehicles or end effectors mounted to a manipulator arm of a robot) having a frame that supports an NDI scanner. The frame may be moved over the outer mold line of a structure. In alternative embodiments, the motion platform may be designed for manual movement.

Effective use of such motion platforms often depends on their accurate localization within the environment within which they move. A number of localization solutions have been developed that may be used for this purpose. Some existing localization systems need separate location measurement components, such as rotational incremental encoders. It may be desirable to provide a system and a method of NDI which avoids the use of rotational incremental encoders dedicated to a location tracking function.

SUMMARY

The subject matter disclosed herein is directed to systems and methods for tracking the location of a non-destructive inspection (NDI) scanner using images of a target object acquired by the NDI scanner (hereinafter referred to as "localization"). The target object has features representing geometric elements, such as object boundaries (discontinuity in depth and/or material type) and surface boundaries (hereinafter "structural features"). Scan images are formed by aggregating successive scan strips acquired using one or two one-dimensional sensor arrays (hereinafter "1-D sensor arrays"). An image processor constructs and then compares successive partially overlapping scan images that include common feature points corresponding to respective structural features of the target object. The image processor is further configured to compute a change in location of the NDI scanner relative to a previous location based on the respective positions of those common feature points in the partially overlapping scan images. This relative physical distance is then added to the previous (old) absolute location estimate to obtain the current (new) absolute location of the NDI scanner.

As used herein, the term "feature point" means a point of a feature that appears in a scan image. For example, a feature point may be the centroid of the feature. As used herein, the term "common feature" means a feature that appears in two successive scan images. As used herein, the term "common feature point" means a point of a common feature. For example, a common feature point may include a point of a common feature in a first scan image and the same point of the same common feature in a second scan image.

In accordance with some embodiments, the system includes a motorized motion platform comprising a frame, a scanner comprising a 1-D sensor array supported by the frame, and a computer system communicatively coupled to receive sensor data from the 1-D sensor array and send control signals for controlling movement of the motorized motion platform. The 1-D sensor array is oriented generally perpendicular to the direction in which the NDI scanner is moving (translating). In one proposed implementation, the 1-D sensor array is fixedly coupled to the frame and moves only when the motion platform moves. In other proposed implementations, the 1-D sensor array is displaceably (e.g., slidably) coupled to the frame and moves only after the motion platform has been moved and then stopped.

In accordance with other embodiments, the system includes a motion platform (manually movable or motorized) comprising a frame, first and second scanners respectively comprising first and second 1-D sensor arrays having centerlines which are oriented mutually parallel and separated by a fixed distance, and a computer system communicatively coupled to receive sensor data from the first and second 1-D sensor arrays. In this case, the two 1-D sensor arrays are oriented perpendicular to the direction of movement.

In accordance with one embodiment having a single 1-D sensor array, subsurface depth sensor data is repeatedly (recurrently, continually) acquired by and output from the 1-D sensor array as the NDI scanner moves at a known speed on a surface of the target object. The resulting 1-D scan strip sequence is fed to a composite scan image construction module which constructs a composite scan image by aggregating successive scan strips. The resulting composite scan image contains (virtual) features corresponding to structural features in the target object. In addition, the composite scan image construction module periodically assembles sequences of scan strips to form individual two-dimensional scan images (also referred to herein as "frames"), which individual frames are partially overlapping. The image processor further includes an image processing and feature point comparison module that is configured to construct and then compare successive partially overlapping scan images (frames) that include common features corresponding to respective structural features of the target object. The image processor further includes an image processing and feature point comparison module that is configured to construct and then compare successive partially overlapping scan images that include common features corresponding to respective structural features of the target object. The image processing and feature point comparison module is further configured to compute a change in location of the scanner relative to the previous location based on the respective positions of a common feature point in the partially overlapping scan images. More specifically, the number of pixels representing the pixel position difference in the respective positions of the common feature point appearing in the two most recently captured scan images is counted and scaled based on the scan strip capture rate (hereinafter "capture rate") and the motion platform speed and the corresponding relative physical distance traveled in the time interval between sequential scan image captures is computed. This relative physical distance is then added to the prior absolute location estimate to get the new (current) absolute location.

In an alternative embodiment that has two mutually parallel 1-D sensor arrays, subsurface depth sensor data is repeatedly (recurrently, continually) acquired by and output from each 1-D sensor array as the NDI scanner moves on a surface of the target object. The resulting 1-D scan strip sequences are fed to respective composite scan image construction modules which construct respective composite scan images by aggregating successive scan strips. The image processor further includes an image processing and feature point comparison module that constructs respective partially overlapping scan images from the respective 1-D scan strip sequences and then compares those scan images in a search for common features. The image processing and feature point comparison module is further configured to compute a change in location of the scanner relative to the previous location based on the respective positions of the common feature point in the partially overlapping scan images. More specifically, the number of pixels representing the pixel position difference in the respective positions of common features appearing in the two most recently captured scan images is counted. Then a scaling factor is computed by dividing the fixed distance by the imaged position difference. The distance separating the first and third X positions is then computed by multiplying the number of scan strips in the first sequence by the scaling factor. This relative physical distance is then added to the prior absolute location estimate to get the new (current) absolute location.

The process disclosed herein enables localization for both manual and automated NDI applications without the need for rotational incremental encoders. Optionally, the localization process may include a correction step to reorient the sensor array, such as an occasional manual check and manual correction of position and orientation. Mapping of systematic correction values can also be used to identify mistakes in fabrication, like the mis-positioning or omission of substructure (e.g., subsurface features).

Although various embodiments of systems and methods for tracking the location of an NDI scanner using scan images acquired from the target object are described in some detail later herein, one or more of those embodiments may be characterized by one or more of the following aspects.

One aspect of the subject matter disclosed in detail below is a method for tracking a location of a scanner, the method comprising: (a) translating a scanner having a 1-D sensor array across a surface of a target object in an X direction at a known speed from a first X position to second, third and fourth X positions in succession; (b) acquiring successive sets of sensor data at a known capture rate as the scanner translates in the X direction; (c) converting the successive sets of sensor data to respective scan strips of scan image data; (d) constructing a first scan image from a first sequence of scan strips converted from sensor data acquired during movement of the 1-D sensor array from the first X position to the third X position; (e) constructing a second scan image from a second sequence of scan strips converted from sensor data acquired during movement of the 1-D sensor array from the second X position to the fourth X position; (f) finding feature points in the first and second scan images; (g) determining which feature points found in step (f) are common feature points in the first and second scan images; (h) computing a pixel position difference between the respective positions of a common feature point in the first and second scan images; and (i) computing a scanner displacement by multiplying the pixel position difference computed in step (h) times a scaling factor representing a distance traveled by the scanner per scan strip.

In accordance with one embodiment, the method described in the immediately preceding paragraph further comprises: computing the pixel position difference by counting a number of pixel columns by which the position of the common feature point in the second scan image is offset from the position of the common feature point in the first scan image; and computing the scaling factor by dividing the known speed by the known capture rate. In addition, the method may further comprise: (j) computing an X position coordinate representing an estimate of the second X position in a frame of reference of the target object by adding the distance separating the first and second X positions to an X position coordinate of the first X position; and (k) storing the X position coordinate of the second X position in association with the second scan image in a non-transitory tangible computer-readable storage medium.

Another aspect of the subject matter disclosed in detail below is a method for tracking locations of first and second scanners that respectively comprise first and second 1-D sensor arrays having respective centerlines which are oriented parallel to a Y direction and separated by a fixed distance. In accordance with one embodiment, the method comprises: (a) translating first and second scanners in tandem across a surface of a target object in an X direction at a known speed, during which translation the first scanner moves from a first X position to a third X position while the second scanner moves from a second X position to a fourth X position, wherein the second X position is between the first and third X positions, and the third X position is between the second and fourth positions; (b) operating the first scanner to acquire a first sequence of sets of sensor data as the first scanner moves from the first X position to the third X position; (c) operating the second scanner to acquire a second sequence of sets of sensor data as the second scanner moves from the second X position to the fourth X position; (d) converting the first sequence of sets of sensor data to a corresponding first sequence of scan strips of scan image data; (e) converting the second sequence of sets of sensor data to a corresponding second sequence of scan strips of scan image data, wherein a number of scan strips in the second sequence of scan strips is the same as a number of scan strips in the first sequence of scan strips; (f) constructing a first scan image from the first sequence of scan strips; (g) constructing a second scan image from the second sequence of scan strips; (h) finding feature points in the first and second scan images; (i) determining which feature points found in step (h) are common feature points in the first and second scan images; (j) computing a pixel position difference between the respective positions of a common feature point in the first and second scan images; and (k) computing a scanner displacement by multiplying the pixel position difference computed in step (j) times a scaling factor representing a distance traveled by the first and second scanners per scan strip.

A further aspect of the subject matter disclosed in detail below is a system comprising: a motorized motion platform comprising a frame; a scanner comprising a 1-D sensor array supported by the frame; and a computer system communicatively coupled to receive sensor data from the 1-D sensor array and send control signals for controlling movement of the motorized motion platform. The computer system is configured to perform operations comprising: (a) controlling the motorized motion platform to translate the scanner across a surface of a target object in an X direction at a known speed from a first X position to second, third and fourth X positions in succession while the one-dimensional sensor array is oriented in a Y direction; (b) acquiring successive sets of sensor data at a known capture rate as the scanner translates in the X direction; (c) converting the successive sets of sensor data to respective scan strips of scan image data; (d) constructing a first scan image from a first sequence of scan strips converted from sensor data acquired during movement of the one-dimensional sensor array from the first X position to the third X position; (e) constructing a second scan image from a second sequence of scan strips converted from sensor data acquired during movement of the one-dimensional sensor array from the second X position to the fourth X position; (f) finding feature points in the first and second scan images; (g) determining which feature points found in step (f) are common feature points in the first and second scan images; (h) computing a pixel position difference between the respective positions of a common feature point in the first and second scan images; and (i) computing a scanner displacement by multiplying the pixel position difference computed in step (h) times a scaling factor representing a distance traveled by the scanner per scan strip.

Yet another aspect of the subject matter disclosed in detail below is a system comprising: a motion platform comprising a frame; first and second scanners respectively comprising first and second 1-D sensor arrays having respective centerlines which are oriented parallel and separated by a fixed distance; and a computer system communicatively coupled to receive sensor data from the first and second 1-D sensor arrays and configured to perform operations comprising: (a) operating the first scanner to acquire a first sequence of sets of sensor data at a known capture rate as the first scanner moves from a first X position to a third X position; (b) operating the second scanner to acquire a second sequence of sets of sensor data at the known capture rate as the second scanner moves from a second X position to a fourth X position, wherein the second X position is between the first and third X positions, and the third X position is between the second and fourth positions; (c) converting the first sequence of sets of sensor data to a corresponding first sequence of scan strips of scan image data; (d) converting the second sequence of sets of sensor data to a corresponding second sequence of scan strips of scan image data, wherein a number of scan strips in the second sequence of scan strips is the same as a number of scan strips in the first sequence of scan strips; (e) constructing a first scan image from the first sequence of scan strips; (f) constructing a second scan image from the second sequence of scan strips; (g) finding feature points in the first and second scan images; (h) determining which feature points found in step (g) are common feature points in the first and second scan images; (i) computing a pixel position difference between the respective positions of a common feature point in the first and second scan images; and (j) computing a scanner displacement by multiplying the pixel position difference computed in step (i) times a scaling factor representing a distance traveled by the first and second scanners per scan strip.

A further aspect is a non-destructive inspection system comprising: a frame; a plurality of wheels rotatably coupled to the frame; a linear guide rail fixedly coupled to the frame; a carriage slidably coupled to the guide rail; a motor; a drive mechanism that mechanically couples the carriage to the motor to cause the carriage to slide along the guide rail during operation of the motor; a 1-D sensor array fixedly coupled to the carriage and oriented perpendicular to the guide rail, the 1-D sensor array comprising a multiplicity of sensors which are mutually aligned; and a motion controller configured to control the motor so that the 1-D sensor array moves relative to the frame in a direction parallel to the linear guide rail.

Other aspects of systems and methods for tracking the location of an NDI scanner using scan images of the target object are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
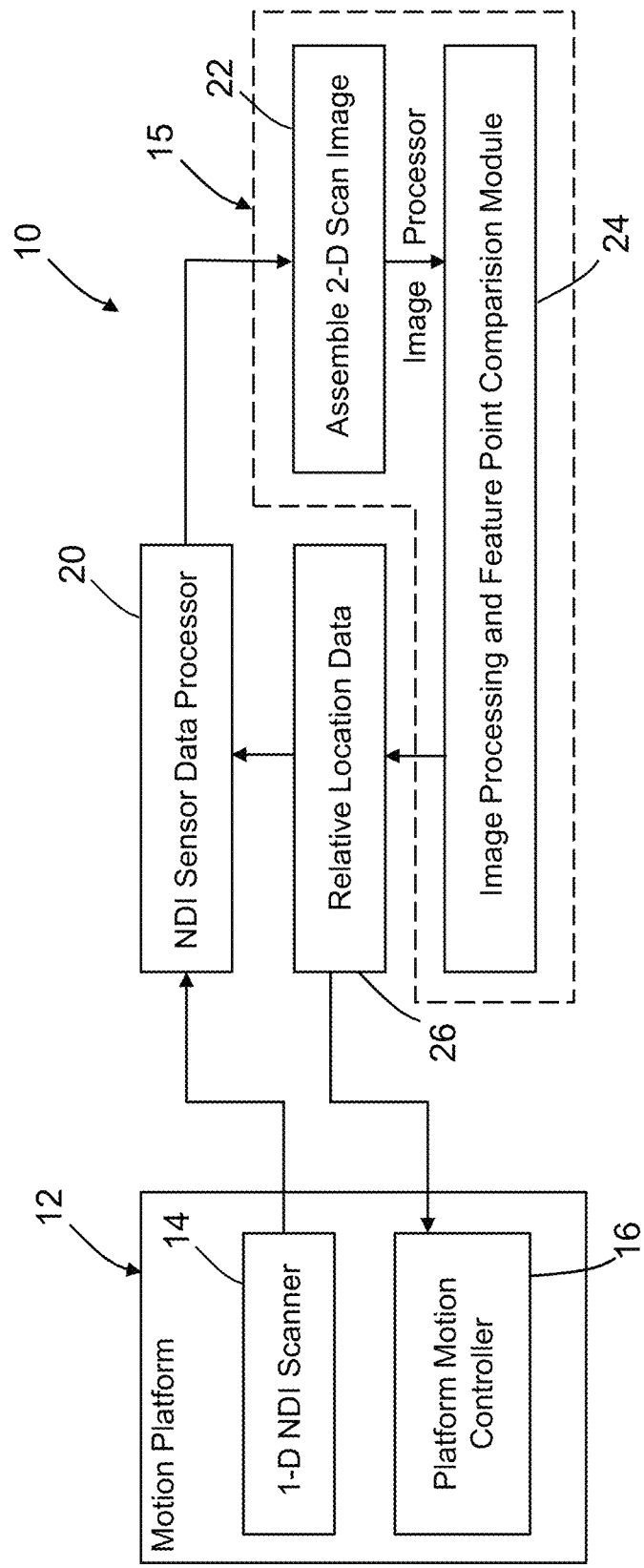
FIG. 1 is a block diagram identifying some components of a system for tracking the location of an NDI scanner which is mounted to a motorized motion platform and comprises a 1-D array of sensors (1-D sensor array) in accordance with one embodiment.

For the purpose of illustration, systems and methods for tracking the location of an NDI scanner using scan images of the target object will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Given by way of non-limiting example for illustration purposes only, the target object may be an aircraft part, such as a barrel-shaped section of an aircraft fuselage. It should be appreciated, however, that the systems and methods described hereinafter with reference to a fuselage section may also be applied to other types of workpieces which are part of some other type of vehicle or structure.

Moreover, the workpiece may be made of any material as desired for a particular application. It will be appreciated that the type of material used for the workpiece may, in part, determine which type of non-destructive inspection technique is used to inspect the workpiece. Given by way of non-limiting examples, the workpiece may be made of composite material, such as a composite laminate made of fiber-reinforced plastic, or a metal, such as aluminum or titanium. It will be understood that it is not intended to limit in any manner whatsoever the materials from which the workpiece to be inspected may be made.

Depending on the type of material being inspected, any one of a multiplicity of types of NDI sensors can be utilized. The method proposed herein may be applied to any 1-D NDI imager, including imagers in which a 1-D array of sensors (such as ultrasonic transducers or eddy current coils) are in contact with the surface being inspected. In alternative embodiments, an infrared thermography flash system, a terahertz camera, a microwave imager, or a laser Doppler vibrometry system could produce non-contact 2-D images that are digitized/pixelized in the X-Y format and can be overlapped, aligned and used for tracking purposes. A variety of types of NDI sensors suitable for use with the scanning apparatus disclosed herein are listed and described in U.S. Pat. No. 7,743,660.

In the context of the specific application of inspecting fuselage sections, the scanning system may comprise means for scanning the skin of the fuselage section from a vantage point external to the fuselage section. In the embodiments disclosed below, the scanning means is an NDI scanner in the form of a 1-D sensor array that collects sensor data from a confronting portion of the fuselage section. In one proposed implementation, the NDI scanner scans the outer mold line of the fuselage section in a raster (e.g., serpentine) scan pattern.

As used herein, the terms "X axis" and "Y axis" refer to respective axes which intersect at right angles at an origin on a surface of a target object and which follow the contour of the surface as the axes extend away from the origin. In cases wherein the surface is planar (flat), the X and Y axes are straight, co-planar and mutually perpendicular. In cases wherein the surface is curved in the Y direction and straight in the X direction, the Y axis is locally tangent to the surface. In cases wherein the surface is curved in both the X and Y directions, the X and Y axes are both locally tangent to the surface. In each case, the Y position coordinate of a point on the surface is measured along the Y axis and equal to a first distance from the origin, while the X position coordinate of the point on the surface is measured along the X axis and equal to a second distance from the origin. On the one hand, if the axis is straight, then the position coordinate is equal to the distance of the point from the origin; on the other hand, if the axis is arc-shaped (because the surface of the target object is curved), then the position coordinate is equal to the arc length (not the chord length) from the origin.

The systems and methods described in some detail below enable localization that tracks the location of an NDI scanner using images of the target object. Scan images are formed by aggregating successive scan strips acquired using one or two 1-D sensor arrays. An image processor constructs and then compares successive partially overlapping scan images that include common features corresponding to respective structural features of the target object. The image processor is further configured to compute a change in location of the NDI scanner relative to a previous location based on the respective positions of those common feature points in the partially overlapping scan images. This relative physical distance is then added to the previous (old) absolute location estimate to obtain the current (new) absolute location of the NDI scanner.

FIG. 1 is a block diagram identifying some components of a system 10 for tracking the location of an NDI scanner 14 comprising a 1-D array of sensors in accordance with one embodiment. In this embodiment, the NDI scanner 14 is mounted on a motion platform 12 that is motorized for automated movement (e.g., a robotic crawler vehicle). The movements of the motion platform 12 are controlled by an onboard platform motion controller 16 so that the NDI scanner 14 follows a pre-planned scan path on the target object. For example, the NDI scanner 14 may be scanned across the surface of the target object as the motion platform 12 translates along an X axis. During such translation, the NDI scanner 14 may be continually activated to scan the surface of the target object and acquire sensor data containing information regarding structural features of the target object.

In accordance with some embodiments, the NDI scanner 14 is rigid, so the 1-D sensor array would not directly conform to the surface of the target object, but in most situations the NDI scanner 14 would be mounted in a manner that allows the 1-D sensor array to align generally with the confronting portion of the target object surface. Also, if the sensors are ultrasonic transducers, there is an acoustic couplant may be used between the sensor array and the surface (e.g., water or some type of gel-like substance or dry acoustic couplant elastomeric material). The presence of acoustic couplant provides some ability to compensate for slight curvature mismatch.

The system 10 partly depicted in FIG. 1 further includes an NDI sensor data processor 20 that is communicatively coupled (via cables or wirelessly) to the NDI scanner 14. The NDI sensor data processor 20 is configured to convert sensor data output by the NDI scanner 14 to 1-D scan image data (hereinafter "scan strips"). The resulting scan strip sequence is fed to an image processor 15. More specifically, the sequence of scan strips is fed to a composite scan image construction module 22 which constructs a composite scan image by aggregating successive scan strips. The resulting composite scan image contains (virtual) features corresponding to structural features in the target object. In addition, the composite scan image construction module 22 periodically assembles sequences of scan strips to form individual two-dimensional scan images (also referred to herein as "frames"), which individual frames are partially overlapping.

In addition, the image processor 15 includes an image processing and feature point comparison module 24 which is communicatively coupled to receive 2-D scan images from the composite scan image construction module 22. The image processing and feature point comparison module 24 may be a processor or computer configured (e.g., programmed) to track the location (also referred to herein as "localization") of the NDI scanner 14 relative to the surface of the target object using the 2-D scan image data. The localization algorithm includes a relative motion updating process based on following scanned features from one captured NDI scan image to the next in order to determine motion of the 1-D sensor array. In accordance with one embodiment, the image processing and feature point comparison module 24 is configured to construct and then compare successive partially overlapping scan images (frames) that include common virtual features (hereinafter "features") corresponding to respective structural features of the target object. The image processing and feature point comparison module 24 finds centroids of common features (hereinafter "common feature points") in the partially overlapping scan images using image processing (e.g., edge detection) and saves the pixel positions of those feature points in a non-transitory tangible computer-readable storage medium (e.g., computer memory).

The image processing and feature point comparison module 24 is further configured to compute a change in location of the NDI scanner 14 relative to a previous location based on the respective positions of respective common feature points in the partially overlapping scan images. More specifically, the number of pixels representing the pixel position difference in the respective positions of centroids of common features appearing in the two most recently captured scan images is counted and scaled based on the capture rate and the motion platform speed and the corresponding relative physical distance traveled in the time interval between sequential scan image captures is computed. In one proposed implementation, the image processing and feature point comparison module 24 computes a scaling factor representing a distance traveled by the scanner per scan strip by dividing the known speed by the known capture rate; and then computes a corresponding distance traveled by the motion platform 12 by multiplying a pixel position difference between the respective positions of the common feature point in the first and second scan images times the scaling factor. The pixel position difference is computed by counting a number of pixel columns by which the position of the common feature point in the second scan image is offset from the position of the common feature point in the first scan image. This relative physical distance traveled is then added to the prior absolute location estimate to get the new (current) absolute location. The absolute location estimate is then used by the platform motion controller 16 to control the motion of the motion platform 12 in accordance with the pre-planned scan path. For example, the location tracking method may further comprise: computing successive scanner displacements; computing successive X position coordinates corresponding to successive X positions of the NDI scanner 14 following respective scanner displacements; and stopping translation of the NDI scanner 14 when the X position coordinate of the scanner equals a limit X position coordinate.

Figure 2A:
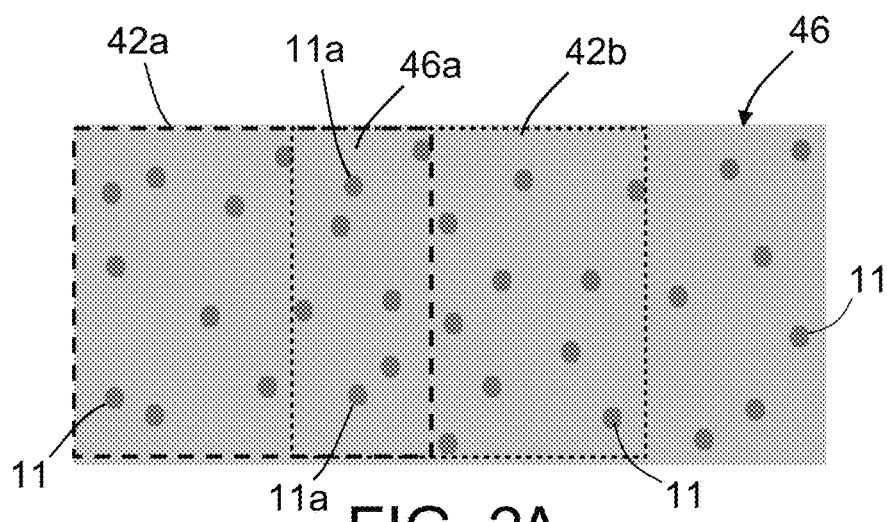
FIG. 2A is a diagram representing a composite scan image formed by aggregating scan image data acquired while scanning a target object having subsurface features using a 1-D sensor array. The dashed and dotted rectangles indicate a pair of partially overlapping scan images.
Figure 2B:
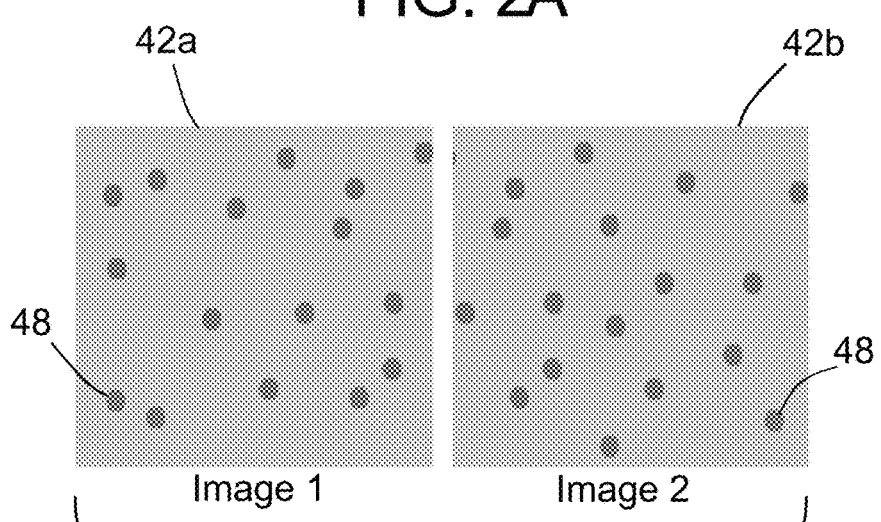
FIG. 2B is a diagram representing a pair of partially overlapping scan images constructed from the sequential scan image data depicted in FIG. 2A.
Figure 2C:
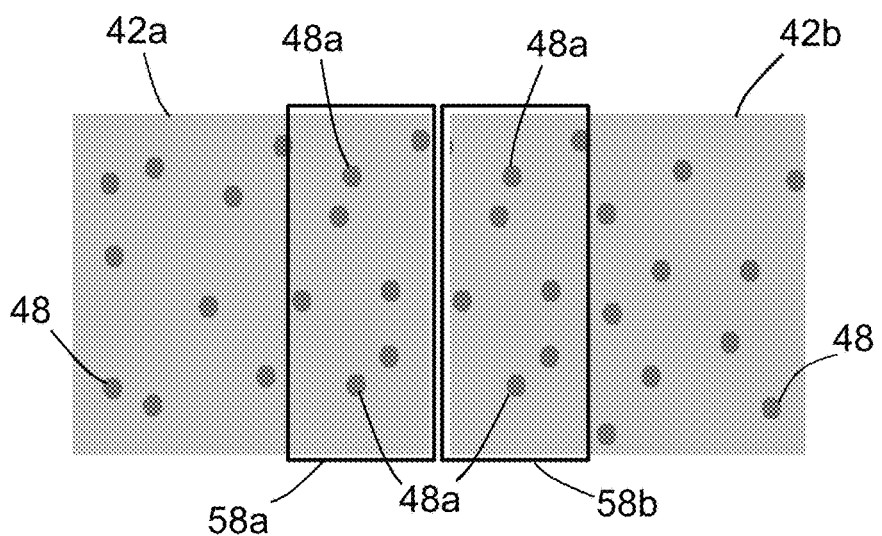
FIG. 2C is a diagram representing sequential scan images containing pixels representing common feature points acquired in the area of partial overlap depicted in FIG. 2A.

FIG. 2A shows a full scan area 46 of a target object having random structural features 11 (represented by dots in this example). The dashed and dotted rectangles indicate a pair of partially overlapping scan images 42a and 42b, which are shown in side-by-side relationship in FIG. 2B. As seen in FIG. 2A, the scan images 42a and 42b cover a common scan area 46a with common features 11a. Common feature points 48a appear in respective regions 58a and 58b of scan images 42a and 42b, as seen in FIG. 2C. Since regions 58a and 58b of scan images 42a and 42b are images of the same rectangular scan area 46a, regions 58a and 58b will be identical (referred to hereinafter as "overlapping regions of the scan images"). These overlapping regions with common features in sequential (successive) scan images are used to track a subsequent location of the NDI scanner 14 relative to a previous location. In addition, the redundant information in one of the scan images 42a or 42b can be omitted when the scan images 42a and 42b are stitched together to form a composite scan image.

Figure 3:
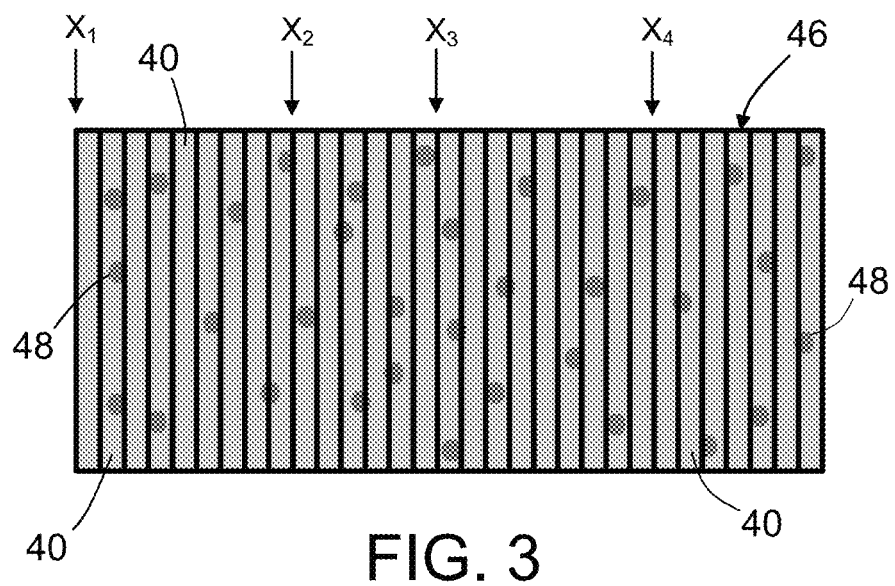
FIG. 3 is a diagram representing a sequence of scan strips converted into respective columns of pixels in a composite scan image.
Figure 4:
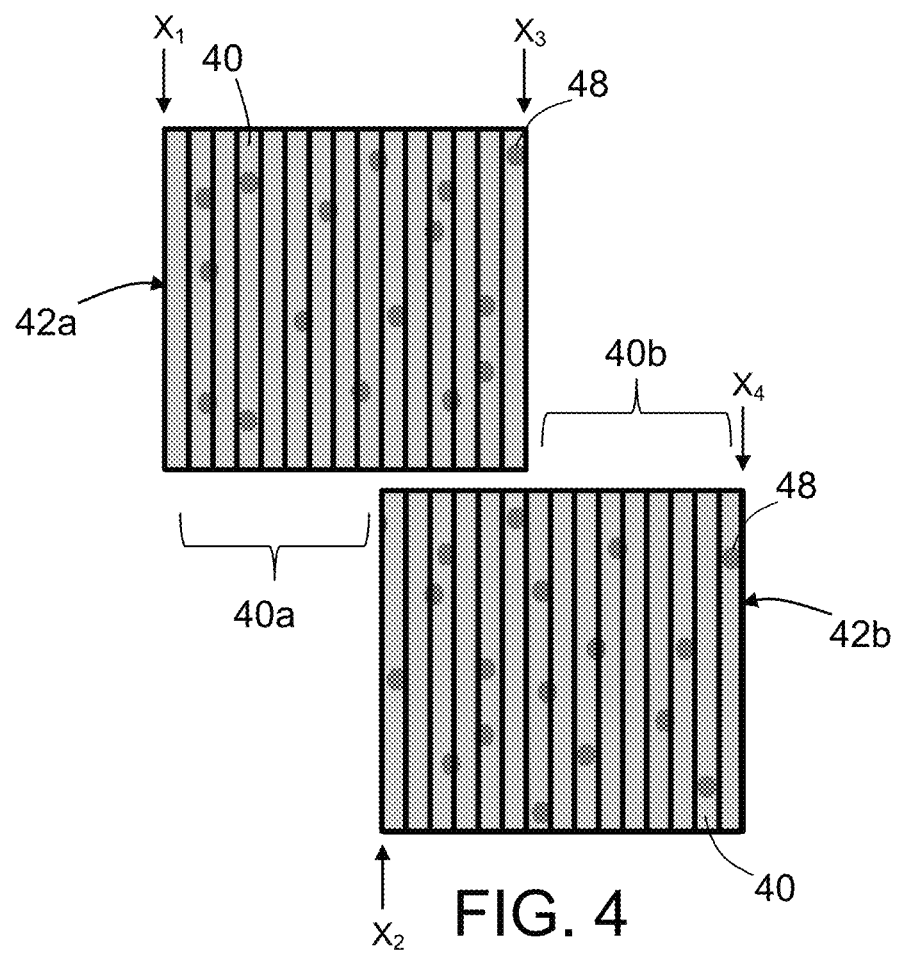
FIG. 4 is a diagram representing a pair of frames containing partially overlapping scan images constructed by removing and adding columns of pixels.

The composite scan image 46 shown in FIG. 2A consists of individual scan strips of scan image data which are acquired in succession during translation of the 1-D sensor array. FIG. 3 is a diagram representing a composite scan image 46 formed by aggregating scan image data acquired while scanning a target object having random structural features using a 1-D sensor array. A sequence of scan strips 40 is converted into respective columns of pixels to form the composite scan image 46. FIG. 4 is a diagram representing a pair of frames containing partially overlapping scan images 42a and 42b constructed by removing and adding scan strips 40. This diagram assumes that scan image 42a is acquired first. Then old scan strips 40a are removed and new scan strips 42b are added to form the second scan image 42b In the example depicted in FIGS. 3 and 4, a scanner having a 1-D sensor array is translated across a surface of a target object in an X direction at a known speed from a first position X1 to second, third and fourth positions X2, X3 and X4 in succession. A first scan image 42a is constructed from a first sequence of scan strips converted from sensor data acquired during movement of the 1-D sensor array from position X1 to position X3; a second scan image 42b is constructed from a second sequence of scan strips converted from sensor data acquired during movement of the 1-D sensor array from position X2 to position X4.

The relative motion updating process proposed herein is based on the concept that partially overlapping sequential scan images will have some features (representing structural features in the target object) within the pair of images that are common. The assumption here is that the second scan image will have some features in common (hereinafter "common features") with the first scan image. The pixel distance difference between the respective positions of a common feature point is counted and scaled, and then the relative physical distance is added to the prior location estimate to get the new absolute location. In the example depicted in FIG. 4, a distance separating positions X1 and X2 may be computed by multiplying a pixel position difference between the respective positions of the common feature point in the scan images 42a and 42b times a scaling factor.

For example, assume that the NDI scanner 14 has a capture rate of 10 full-array sets of sensor data per second (resulting in 10 scan strips per second), with the motion platform 12 moving at a speed of 2 inches per second in the X direction. Then the capture rate is 2/10 (or 0.2) inch per sample. One set of sensor data of the full array is equivalent to one column of pixels, so in the X direction (which is the direction the vehicle is moving in) the scaling factor would be 0.2 inch per pixel. If the image processor 15 determined that there were 15 pixels in the X direction between a common feature point in one image compared to the common feature point in the next image, then the physical distance that the platform moved between image one and image two is 15*0.2=3 inches.

Figure 5:
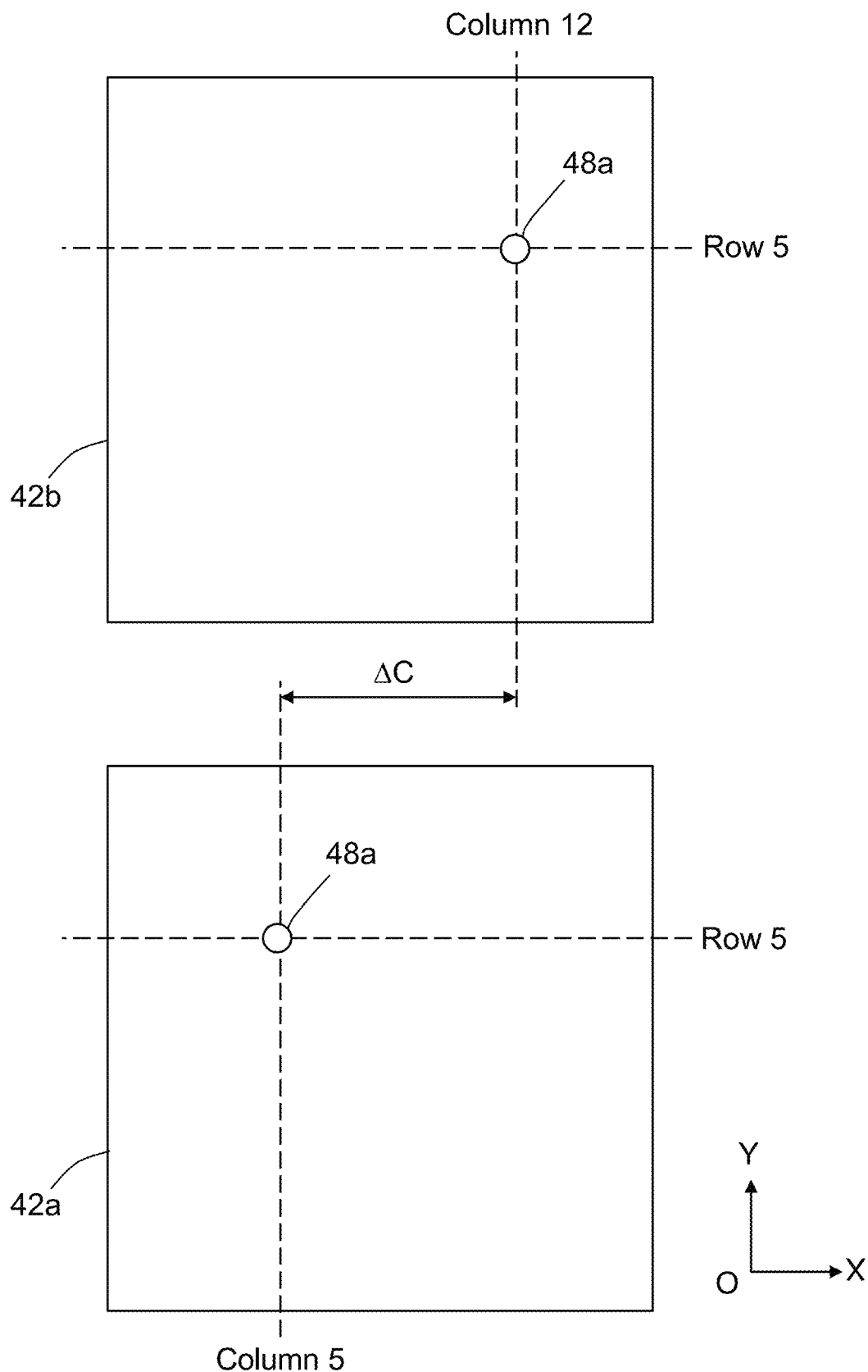
FIG. 5 is a diagram showing the positions of the common feature point in partially overlapping scan images constructed by aggregating scan image data acquired using a moving 1-D sensor array.

FIG. 5 is a diagram showing the positions of a common feature point 48a in partially overlapping scan images 42a and 42b constructed by aggregating scan image data acquired using a moving 1-D sensor array having one row of sensors. This example assumes that the motion platform 12 is controlled or constrained to move the NDI scanner 14 parallel to an X axis on the surface of the target object with the row of sensors disposed parallel to the Y axis (perpendicular to the X axis), in which case the centerline of the 1-D sensor moves from a first position having a first X position coordinate in a frame of reference on the surface of the target object to a second position having second X position coordinate at a distance from the first X position coordinate.

The image processing and feature point comparison module 24 is configured to: (a) find feature points in the first and second scan images 42a and 42b; (b) determine which feature points found in step (a) are common feature points (e.g., common feature point 48a in FIG. 5) in the first and second scan images 42a and 42b; and (c) then count the number of pixel columns which separate pixels indicating the positions of common feature points in the first scan image 48a from pixels indicating the positions of the same common feature points in the second scan image (e.g., a first pixel indicating the position of common feature point 48a in the first scan image 42a and a second pixel indicating the position of common feature point 48a in scan image 42b in FIG. 5). This change in pixel position in terms of pixel columns is indicated by ΔC in FIG. 5. In this example, the pixel containing the common feature point 48a in scan image 42a is positioned in Row 5 and Column 5, whereas the pixel containing the common feature point 48a in scan image 42b is positioned in Row 5 and Column 11, meaning that ΔC=6 columns. If a calibration scaling factor $f_{cal}$ characterizing the relationship between the pixel column difference and the physical distance traveled by the 1-D sensor array were known, then the physical distance traveled by the 1-D sensor array in the X direction may then be computed by multiplying ΔC by the calibration scale factor $f_{cal}$. Then the second X position coordinate (indicating the position of the 1-D sensor array in the frame of reference of the target object) may be computed by adding the estimated physical distance traveled to the first X position coordinate.

In the above-described setup, the feature points are defined by significant local changes of intensity (such as a change in contrast or color) occur which within the scan images. The system does not need to know which structural features within the physical object are represented by these virtual features; the system merely needs to detect the same pattern of pixels in sequential scan images. The overall concept is sometimes referred to as "solving the camera pose problem"—in this case the "camera" is the NDI scanner. The system tracks the set of points in successive scan images and determines their 2-D position from one scan image to the next scan image to derive the relative displacement of the common feature points in the scan images. This information is then used to compute the relative physical motion (position and orientation) of the motion platform 12 on which the NDI scanner 14 is mounted, for the period of time between one scan image and the subsequent scan image. In order for this to work for both position and orientation, there needs to be a sufficient number of common features. Theoretically, the minimum is two, but it is better to have more common feature points in order to improve the estimate.

The use of feature point comparison in a localization process has been disclosed elsewhere. For example, the simultaneous localization and mapping (SLAM) method uses data from one or more optical cameras or laser scanners and an extended Kalman filter to: (1) update the current state (position) estimate using dead reckoning data; (2) update the estimated position based on re-observed features (landmarks); and (3) add new features (landmarks) to the current state. In SLAM, relative displacements of feature points common to both images are used to provide the offset estimate. For this, relatively small position and orientation changes are required, along with substantial overlap between the images in order to achieve registration. Additionally, known reference dimensions of the 1-D sensor array are required to determine the scale of the displacement.

Various algorithms based on common feature points may be used to determine the distance moved by a scanner during a time interval separating two instants in time when two images are captured. These algorithms may be used to determine the position and orientation offsets between the two images. The process involves aligning two sets of common feature points acquired from the two images and determining the amount that one set of points had to be translated and rotated in order to achieve the optional alignment between the two sets of points. Such algorithms are configured to solve this point-to-point matching problem.

One of the methods that can be used determine the position and orientation offsets between the common feature points in two images (or more generally, between two sets of points) is to use the so-called Iterative Closest Point (ICP) algorithm, which is sometimes referred to as the "Iterative Corresponding Point" algorithm. In the present case the offsets are determined from the respective x and y pixel positions of common feature points in the two images.

The basic form of the ICP algorithm is described in a technical article entitled "A Method for Registration of 3-D Shapes", authored by Besl and McKay in 1992 (hereinafter "1992 article"). Variations of the IPC algorithm are used by several of the SLAM methods to align groups of points (this type of alignment is also known as "registration"). There are several speed improvements to the concept that allows SLAM to run faster than the basic form of the ICP method, but the core idea is the same. The 1992 article describes a solution for points in a 3-D space (x, y, z) as well as points in a 2-D space (x, y), in addition to other types of geometric data. The system disclosed herein uses the form of the ICP algorithm that involves point sets. This method determines how much a first set of points has to translate or rotate from its starting position and orientation to another position and orientation that minimizes the overall distance between the first set of points and a second set of points.

The basic form of the ICP algorithm is the following: (1) for each point in a given set of point data, compute the closest point in the other set using a distance metric; (2) estimate the amounts of translation and rotation needed to align the sets of points; (3) transform the points in one set by the amount determined in the translation and rotation estimates; (4) iterate (i.e., return to step (1) to compute the closest points again); and (5) stop the iteration when a predetermined distance metric value is achieved (e.g., a distance metric value equal to a specified threshold).

To start, the distance from each point in each set of points is determined using a distance measurement or "distance metric" (here a mean-square distance metric is used); then one of the point sets is moved (offset) in order to reduce the mean-square distance. The ICP method requires an initial estimate of the position and orientation offsets. In the instant application, a rough approximation of the offsets is made using the desired direction of travel and a current velocity estimate of the motion platform (this approximation does not have to be very accurate). Then the distance measurements are computed again, after which new estimates for the position and orientation offsets are computed using an iterative optimization method such as the gradient descent method. This iteration continues until a convergence criterion is reached. Ideally, if each point in one set had exactly one corresponding point in the other set of points and all of the points were acquired accurately, the overall offset determined by the mean-square distance metric would be zero, but since there may be outlier points in one set that do not align with points in the other set (as well as small errors in acquisition accuracy), the optimal mean-square distance will not be zero. For realistic scenarios in which there are some points in common between the two sets and some that are not common, the method will not reach a zero mean-square distance. So the overall method needs to determine when to stop the iterative search, which is usually when the rate of convergence slows to some specified amount.

The common feature points are the points with the smaller closest point distance values compared to the points with the largest closest point distance values. The basic ICP algorithm finds the common feature points along the way, but the ICP algorithm does not need to know which points they are before starting the rest of the processing. For the method to work, a sufficient number of common feature points are still required, but they don't need to be explicitly found in a dedicated separate step from the position and orientation offset determination process. As the iterations are performed, the common feature points are discovered, and in some variations of the ICP process, the not-common feature points (e.g., the outliers) are culled from the analysis early in the process in order to speed up the convergence (reducing the number of iterations needed). In other methods, or other variations of the ICP method, the outliers may be culled first from the common feature points to improve performance.

In summary, ICP technique uses common feature points between two sets of points to determine the position and orientation offsets of one point set relative to the other point set. Depending on the specific algorithm used, the finding of the common feature points from both sets of points may or may not be a separate step from the use of the points to determine the position and orientation offsets. For example, some versions of the ICP algorithm determine the common feature points concurrently with determining the position and orientation offsets.

To compute the absolute displacement in the frame of reference of the surface of the target object, the system proposed herein sums the relative displacements together after each set of scan images is processed, which is known as dead reckoning. However, as more and more discrete relative distance values are added together, the absolute location estimate becomes less accurate, so to address this deviation, one may compare the features appearing in the scan images to landmarks/features with known coordinates. The absolute location estimate is updated based on these known coordinates, which serves to re-calibrate the system. The image-to-image feature tracking happens at a high update rate, and the comparison to known landmark/feature data happens at a lower update rate.

Figure 6:
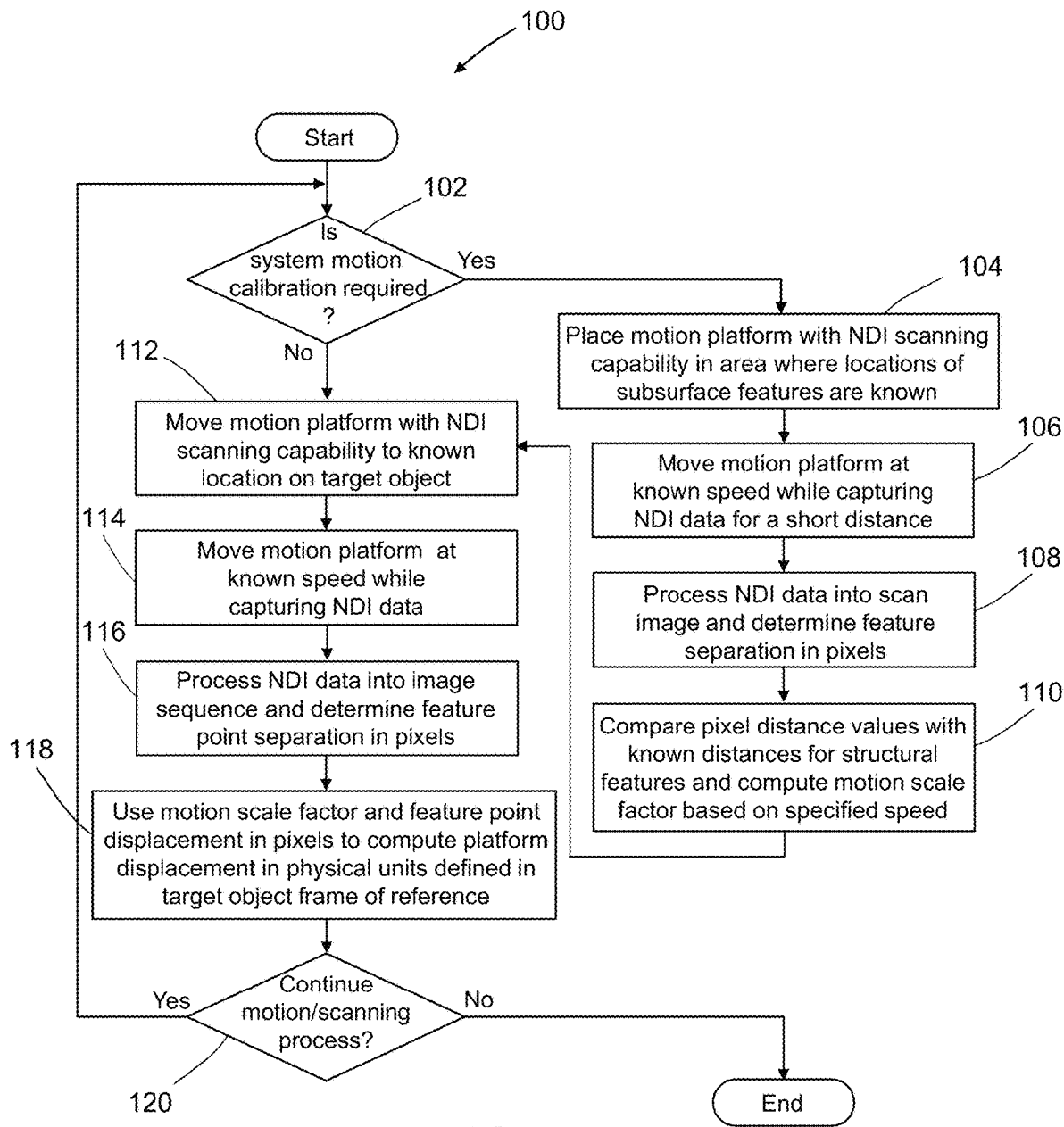
FIG. 6 is a flowchart identifying steps of a method for tracking the location of an NDI scanner in the frame of reference of a target object using scan images derived from sensor data acquired by the scanner's 1-D sensor array in accordance with an alternative embodiment.

FIG. 6 is a flowchart identifying steps of a method 100 for tracking the location of a 1-D sensor array in the frame of reference of a target object using scan images derived from sensor data in accordance with an alternative embodiment. At the start, a determination is made whether system motion calibration is required or not (step 102). If a determination is made in step 102 that system motion calibration is required, the motion platform 12 with NDI scanner 14 is placed on the surface of the target object on one side of an area where the positions and separation distances of structural features are known (step 104). Otherwise, if a determination is made in step 102 that system motion calibration is not required, the motion platform 12 with NDI scanner 14 is moved to a known location on the surface of the target object at which the NDI scanning procedure will be initiated (step 112).

During the system motion calibration procedure, the motion platform 12 starts to translate the NDI scanner 14 from one side toward the other side of the known area at a known speed. As the motion platform 12 translates at known speed (assuming no wheel slippage), the NDI scanner 14 is activated to capture NDI sensor data at a known capture rate for a short distance (step 106). More specifically, the sensors of the 1-D sensor array of the NDI scanner 14 are activated in sequence repeatedly at regular intervals of time, resulting in a sequence of sets of NDI sensor data. The sets of NDI sensor data are converted into respective scan strips and then the scan strips are aggregated to form a composite scan image. The difference in the positions of two feature points in the scan image—corresponding to two structural features of the target object separated by a known physical distance—is then determined (step 108). For example, the difference in position may be expressed in terms of number of pixel columns separating the respective pixels corresponding to the centroid of the features of interest. A calibration scaling factor is then computed by dividing the known separation distance of the two structural features by the pixel position difference of the corresponding virtual feature points in the scan image (step 110). Digital data representing the value of the calibration scaling factor is stored in a non-transitory tangible computer-readable storage medium (e.g., computer memory).

Upon completion of the calibration procedure, the motion platform 12 with NDI scanner 14 is placed on the surface of the target object at the known location selected as the starting point for the NDI scanning procedure (step 112). During the NDI scanning procedure, the motion platform 12 translates the NDI scanner 14 at a known speed. As the motion platform 12 translates at known speed, the NDI scanner 14 is activated to capture NDI sensor data at a known capture rate (step 114). More specifically, the sensors of the 1-D sensor array of the NDI scanner 14 are activated in sequence repeatedly at regular intervals of time, resulting in a sequence of sets of NDI sensor data. The sets of NDI sensor data are converted into respective scan strips and then the scan strips are aggregated to form partially overlapping scan images. The difference in the positions of the common feature point appearing in the partially overlapping scan images is then determined (step 116). For example, the difference in position may be expressed in terms of number of pixel columns separating the respective pixels corresponding to the centroid of the common feature point. The physical distance traveled by the motion platform 12 is then computed by multiplying the difference between the respective positions of the common feature point in the first and second scan images times the calibration scaling factor (step 118). The computed travel distance may be used to compute the current absolute location of the motion platform 12 (and NDI scanner 14) in the frame of reference of the target object by adding the computed platform displacement to a previous absolute location.

A determination is then made whether the motion/scanning process should be continued or not (step 120). If a determination is made in step 120 that the motion/scanning process should be continued, then method 100 returns to step 102. Otherwise, if a determination is made in step 120 that the motion/scanning process should not be continued, then method 100 is terminated.

Figure 7:
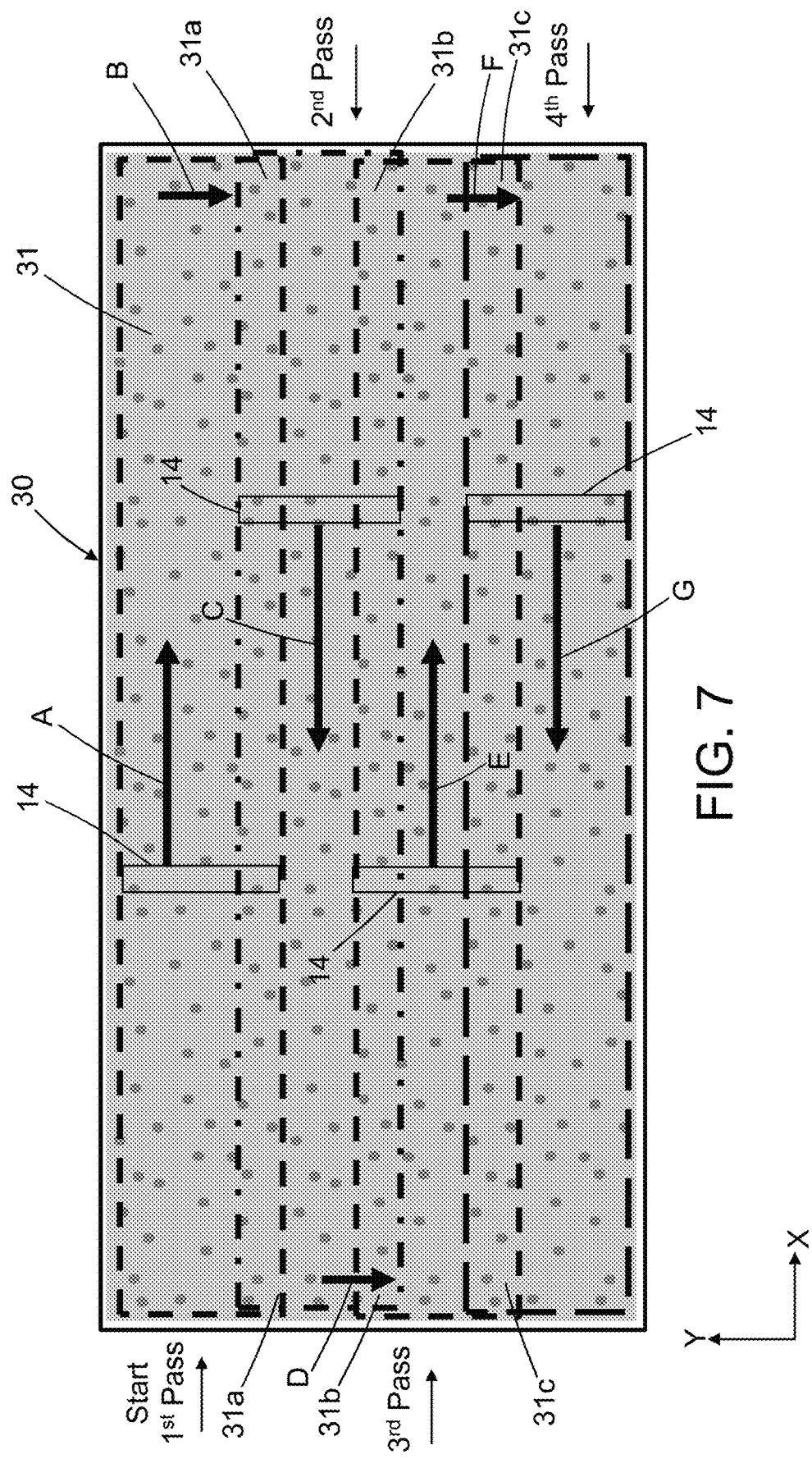
FIG. 7 is a diagram showing multiple partially overlapping paths in a raster scan pattern consisting of sequential passes of an NDI scanner over the surface of a target object.

FIG. 7 is a diagram showing multiple partially overlapping paths in a raster scan pattern consisting of sequential passes of an NDI scanner 14 over a surface 31 of a target object 30 having a rectangular area. The NDI scanner 14 is alternatingly translated along the X and Y axes so that it follows a serpentine path to effect a raster scan of the area of surface 31. The NDI scanner 14 is shown in four different positions at respective moments in time during respective linear passes parallel to the X axis. The serpentine scan path (indicated by arrows) may be used to provide complete scan coverage of a rectangular surface area. In order to achieve the type of motion shown in FIG. 7, the motion platform may be a holonomic vehicle. The starting position of the NDI scanner 14 is indicated by the legend "Start" adjacent the upper left-hand corner of the rectangular surface 31 in FIG. 7. The first pass from the left edge to the right edge of the target object 30 (in a rightward X direction) is indicated by an arrow A; the scan area covered by the NDI scanner 14 during the first pass is bounded by a dashed rectangle that extends from the left edge to the right edge of target object 30. During the first pass, the 1-D sensor array carried by the NDI scanner 14 is activated to acquire NDI sensor data from the target object 30. When the rightwardly translating NDI scanner 14 reaches the right edge, the motion platform (not shown in FIG. 7) stops. The platform motion controller 16 is configured to determine whether the NDI scanner 14 has reached the right edge or not by continually computing a current X position coordinate representing an estimate of the current position of the NDI scanner 14 in the frame of reference of the target object 30 in the manner described herein and then comparing the current X position coordinate to a limit X position coordinate. When the current X position coordinate becomes equal to the limit X position coordinate, rightward translation of the NDI scanner 14 is stopped. Then the platform motion controller 16 drives the motion platform 12 in the downward Y direction (e.g., by rotating 90 degrees). Then the motion platform 12 is translated in the downward Y direction (as indicated by arrow B) for a distance less than the length of the 1-D sensor array and stopped. The motion platform is then driven in the leftward X direction.

Next the motion platform moves the NDI scanner 14 in the leftward X direction from the right edge to the left edge of the target object 30 (hereinafter "second pass"). The second pass from the right edge to the left edge of the target object 30 is indicated by an arrow C; the scan area covered by the NDI scanner 14 during the second pass is bounded by a dash-dot rectangle that extends from the right edge to the left edge of target object 30. During the second pass, the 1-D sensor array is activated to acquire NDI sensor data from the target object 30. Because the NDI scanner 14 was translated in the downward Y direction by a distance less than the length of the 1-D sensor array, the area scanned during the second pass partially overlaps the area scanned during the first pass, as indicated by overlap area 31a which is bounded on one side by a dashed line and on the other side by a dash-dot line in FIG. 7. When the leftwardly translating NDI scanner 14 reaches the left edge, the motion platform 12 stops, moves the NDI scanner 14 in the downward Y direction (as indicated by arrow D) by a distance less than the length of the 1-D sensor array, stops again and then is driven in the rightward X direction.

Next the motion platform moves the NDI scanner 14 in the rightward X direction from the right edge to the left edge of the target object 30 (hereinafter "third pass"). The third pass from the left edge to the right edge of the target object 30 is indicated by an arrow E in FIG. 7; the scan area covered by the NDI scanner 14 during the third pass is bounded by a dashed rectangle that extends from the left edge to the right edge of target object 30. During the third pass, the 1-D sensor array is activated to acquire NDI sensor data from the target object 30. Because the NDI scanner 14 was again translated in the downward Y direction by a distance less than the length of the 1-D sensor array, the area scanned during the third pass partially overlaps the area scanned during the second pass, as indicated by overlap area 31*b* which is bounded on one side by a dashed line and on the other side by a dash-dot line in FIG. 7. When the rightwardly translating NDI scanner 14 reaches the right edge, the motion platform stops and then moves the NDI scanner 14 in the downward Y direction (as indicated by arrow F) by a distance less than the length of the 1-D sensor array and then stops. The motion platform is then again driven in the leftward X direction.

Next the motion platform again moves the NDI scanner 14 in the leftward X direction from the right edge to the left edge of the target object 30 (hereinafter "fourth pass"). The fourth pass from the right edge to the left edge of the target object 30 is indicated by an arrow G in FIG. 7; the scan area covered by the NDI scanner 14 during the fourth pass is bounded by a dashed rectangle that extends from the left edge to the right edge of target object 30. During the fourth pass, the 1-D sensor array is activated to acquire NDI sensor data from the target object 30. Because the NDI scanner 14 was again translated in the downward Y direction by a distance less than the length of the 1-D sensor array, the area scanned during the fourth pass partially overlaps the area scanned during the third pass, as indicated by overlap area 31*c* which is bounded on one side by a dashed line comprising short dashes and on the other side by a dashed line comprising long dashes. When the leftwardly translating NDI scanner 14 reaches the left edge, the scanning operation is completed and the motion platform stops.

Figure 8:
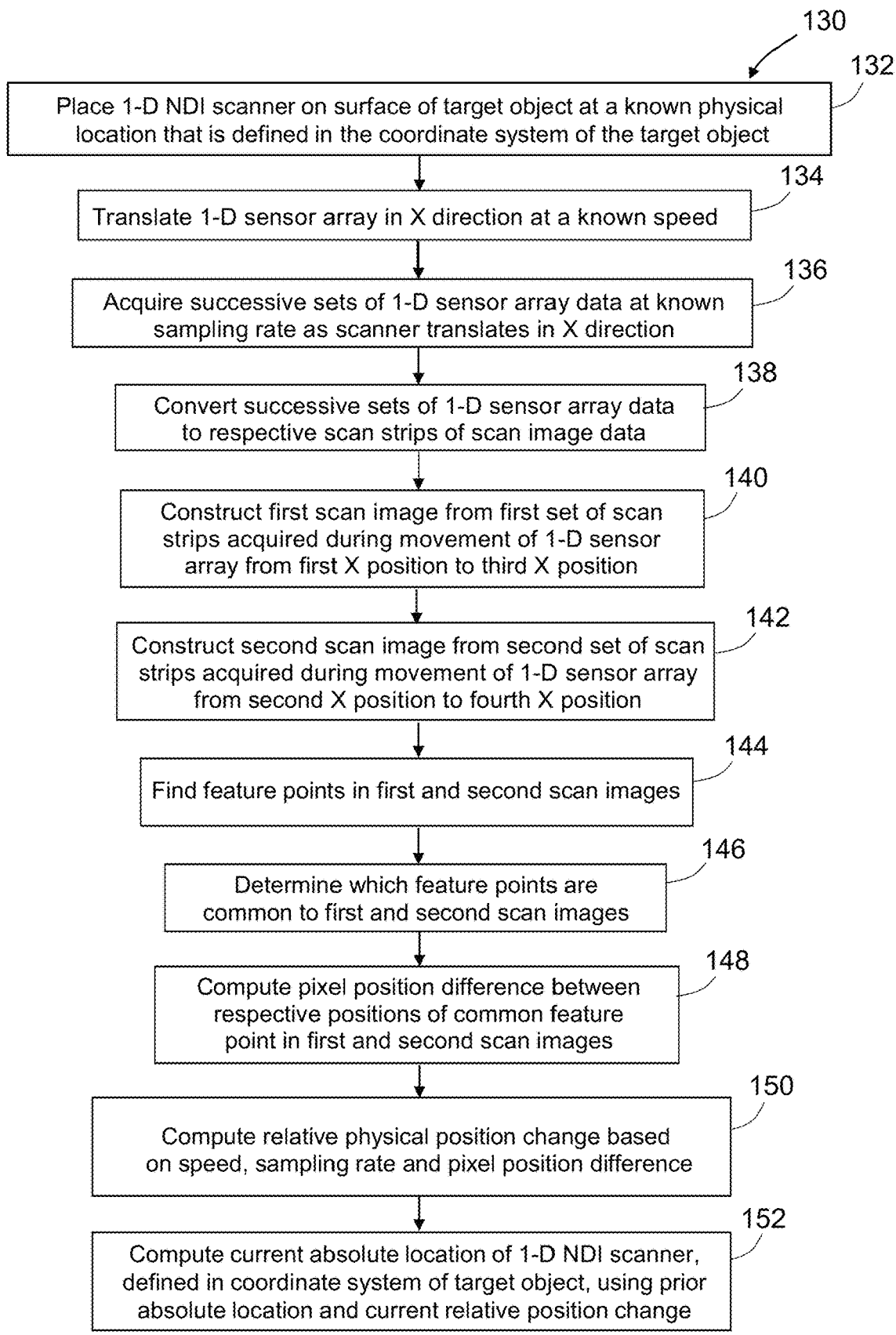
FIG. 8 is a flowchart identifying steps of a method for computing a current absolute location of a 1-D NDI scanner, defined in a coordinate system of the target object, by comparing partially overlapping scan images, computing a current relative position change using common feature points and then adding that relative position change to a previous absolute location.

FIG. 8 is a flowchart identifying steps of a method 130 for computing a current absolute location of a 1-D NDI scanner, defined in a coordinate system of the target object, in accordance with one embodiment. During set-up of the system, the 1-D NDI scanner (including a 1-D scanner array and associated circuitry) is placed on the surface of the target object at a known physical location (also referred to herein as initial "absolute location") that is defined in the coordinate system of the target object (step 132). The 1-D NDI scanner is then translated across the surface of the target object in an X direction at a known speed from a first X position to second, third and fourth X positions in succession (step 134). Successive sets of sensor data are acquired at a known capture rate as the scanner translates in the X direction (step 136). The successive sets of sensor data are converted to respective scan strips of scan image data (step 138). An image processor then constructs a pair of scan images by aggregating scan strips. More specifically, a first scan image is constructed from a first sequence of scan strips converted from sensor data acquired during movement of the 1-D sensor array from the first X position to the third X position (step 140); and a second scan image is constructed from a second sequence of scan strips converted from sensor data acquired during movement of the 1-D sensor array from the second X position to the fourth X position (step 142). The image processor (more specifically, the image processing and feature point comparison module 24) then finds feature points in the first and second scan images (step 144) and determines which feature points found in step 144 are common feature points in the first and second scan images (step 146). The image processor computes a pixel position difference between the respective positions of a common feature point in the first and second scan images (step 148) and computes a scanner displacement by multiplying the pixel position difference computed in step 148 times a scaling factor representing a distance traveled by the scanner per scan strip (step 150). More specifically, the image processor computes the relative physical position change of the 1-D sensor array based on the known speed, known capture rate and difference between respective positions of the common feature point in first and second scan images. In one proposed implementation, the relative physical position change is the distance separating the first and second X positions (hereinafter "scanner displacement") in the frame of reference of the target object. The current absolute location of the 1-D NDI scanner, defined in the coordinate system of the target object, is then computed using the prior absolute location and the current relative position change (step 152).

In accordance with one proposed implementation, the distance separating the first and second X positions is computed by multiplying a pixel position difference between the respective positions of the common feature points in the first and second scan images times a scaling factor representing a distance traveled by the scanner per scan strip. The pixel position difference is computed by counting a number of pixel columns by which the position of the common feature point in the second scan image is offset from the position of the common feature point in the first scan image. The scaling factor is computed by dividing the known speed of the motion platform by the known capture rate of the NDI scanner.

In one proposed implementation, the computer system is further configured to associate respective time stamps with the scan strips of scan image data to mark when the corresponding set of sensor data was captured. The time stamps may be used to compute the X position coordinate of the NDI scanner 14 at the time when a scan strip of interest (e.g., a scan strip containing a feature point of interest) was acquired by multiplying a time interval by the known speed of the motion platform, the time interval being bounded by a first time stamp associated with a scan strip acquired at an X position having a known X position coordinate and a second time stamp associated with the scan strip of interest.

In some use cases, the user may be looking at a display of a single NDI scan image and want to extract position coordinates of a single feature of interest. In the context of the method partly depicted in FIG. 8, the user may find a feature point in a scan image representing a structural feature of interest in the target object. A computer system may be configured (e.g., programmed) to calculate an X position coordinate of the structural feature based on an X position coordinate of the one-dimensional sensor array at a time when a scan strip including the feature point was acquired. In one proposed implementation, the computer system is further configured to associate respective time stamps with the scan strips of scan image data to mark when the corresponding set of sensor data was captured. In the case of a wheeled motion platform, the X position coordinate of the structural feature of interest may be computed based at least partly on a correction for wheel slippage.

The localization methodology described above is a dead reckoning process, which means that as more discrete relative distance values are summed, the absolute location estimate becomes less accurate. An optional correction process may be used along with the basic relative localization process to improve the location estimate based on knowledge of identified common features within the scan image whose position coordinates are known. This correction process, running at a lower update rate than the primary feature tracking process, can be used to improve the location estimate to compensate for feature compounding measurement errors.

In accordance with some embodiments, the localization method includes periodic correction steps to relocate the 1-D sensor array, such as occasional manual checks and manual corrections of position and orientation. For example, the array scans the length of the part, moves over less than the width of the array, and then scans back to the original edge in a manner similar to what is shown in FIG. 7. The distance from the start position can be checked and adjusted after each scan pass, or after several passes, as can the array angle.

In the case of a robot crawler vehicle, wheel slippage in the path direction will become obvious as the NDI scanner travels across structural features of the target object. The position and orientation between scans could be checked with a distance measurement to the start point and simple laser line alignment adjustment to the start position. If there is a random or non-repeating pattern, the position and orientation of the array can be checked with each overlapping pass, and be corrected manually using known reference features on the target object, whenever there is significant divergence.

As previously described with reference to FIG. 1, the composite scan image 46 (shown FIG. 3) is constructed by the composite scan image construction module 22 by aggregating successive scan strips. In accordance with a further aspect, if an accurately scaled composite scan image is desired, one may scale the composite scan image to the proper size afterward if the actual overall distance is known from other landmark data. It may also be appreciated that it is not always the case that a composite scan image would need to be stored in memory. That would be the case only when a composite scan image is useful for some type of analysis process (such as NDI analysis). In other situations, the scan image data may be stored in memory only for location tracking purposes, and the localization process will delete individual images from memory when they are no longer needed for feature alignment.

The 1-D NDI sensor-based localization process proposed herein is applicable to automated motion control systems using feedback control (such as robots and surface-crawling vehicles), as well as to manual motion control systems (such as hand-held devices).

For manual movement of a 1-D NDI scanner, there are several options: (1) to slide the 1-D NDI scanner over the surface, the support housing for the 1-D NDI scanner may be made of some type of low-friction plastic (such as Delrin) to reduce sliding resistance and potential scratching of the surface; or (2) a support frame for the 1-D NDI scanner may be provided with three or more omnidirectional wheels.

For automated movement, the 1-D NDI scanner may be mounted to the frame of a crawler vehicle (e.g., a holonomic-motion or non-holonomic-motion crawler vehicle). For example, a tethered crawler vehicle capable of scanning a 1-D sensor array on a surface of a fuselage is disclosed in U.S. Pat. No. 8,738,226. In alternative embodiments, the 1-D sensor array may be mounted to vacuum-adhering crawler vehicles of the types disclosed in U.S. Pat. Nos. 8,738,226 and 10,168,287. Automated movement may alternatively be achieved by mounting an NDI scanner to a frame assembly that is coupled to an end effector at the distal end of a manipulator arm (articulated, telescopic, gantry, etc.). (As used herein, the term "end effector" means the last link of an automated apparatus comprising an arm, at which endpoint a frame assembly that supports an NDI scanner is coupled.) A suitable robot comprising an articulated arm is disclosed in U.S. Pat. No. 9,933,396. In accordance with an alternative automated system, the NDI scanner may be carried by an unmanned aerial vehicle (UAV) that flies to the target area and then drags a sensor array over the surface of the target area. For example, U.S. patent application Ser. No. 16/202,347 discloses a UAV which carries a 1-D sensor array.

In accordance with alternative embodiments, the system includes a motion platform comprising a frame, a pair of 1-D sensor arrays separated by a fixed distance and a computer system communicatively coupled to receive sensor data from the pair of 1-D sensor arrays. In this case, the two 1-D sensor arrays are oriented perpendicular to the direction of movement. As long as the motion platform 12 is moved far enough so that each 1-D sensor array acquires some of the same features, then the location tracking method proposed herein may be performed by using the feature point alignment technique to track the differences in the positions of the common feature point appearing in the pair of scan images. The motion platform may be either manually movable (hand-held) or motorized (automated).

Figure 9:
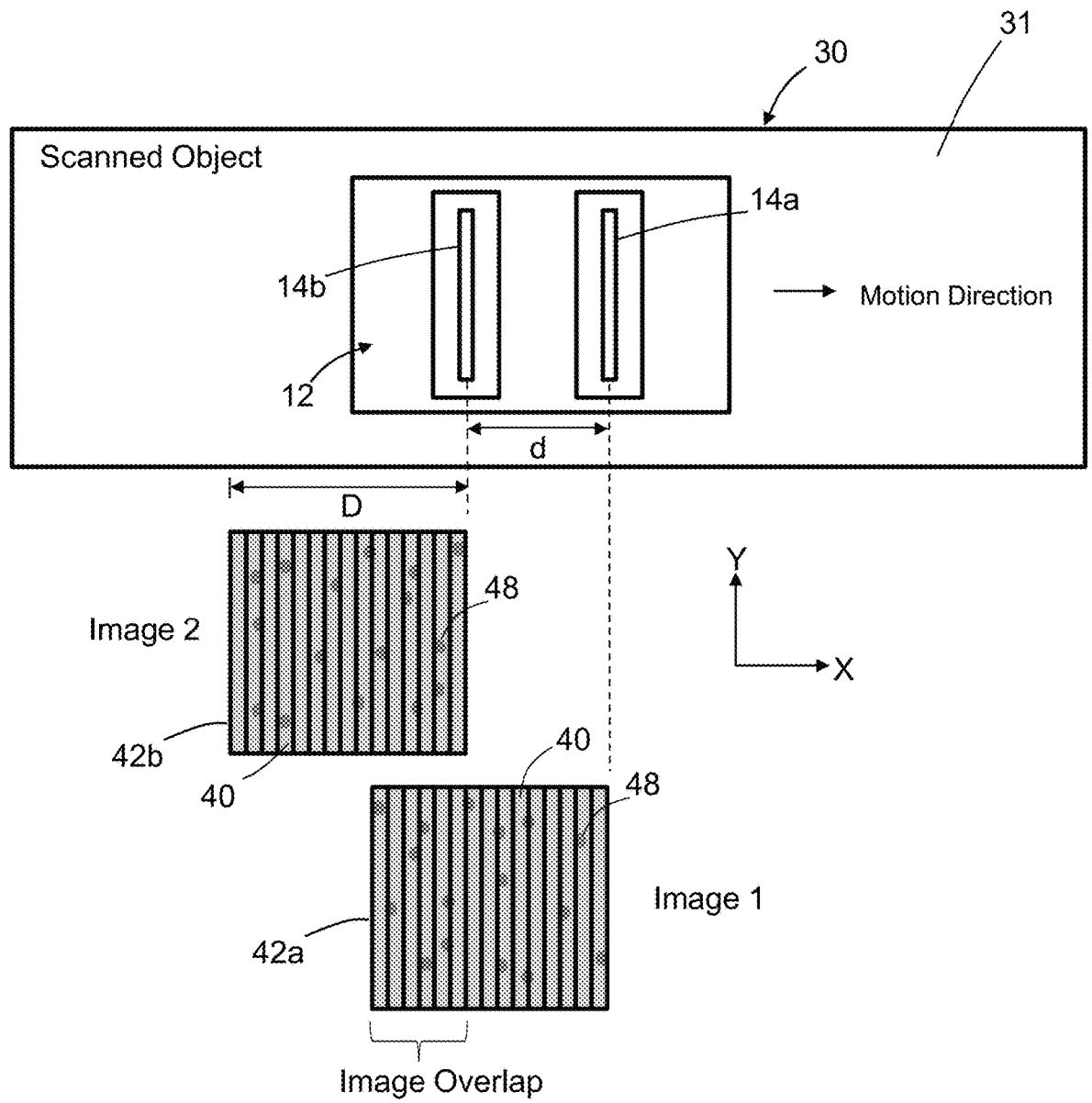
FIG. 9 is a diagram showing a top view of a motion platform equipped with a pair of mutually parallel 1-D sensor arrays in accordance with an alternative embodiment and moving on a surface of a target object.

FIG. 9 is a diagram showing a top view of a motion platform 12 moving on a surface 31 of a target object 30. The direction of motion is indicated an arrow directed rightward in FIG. 9. The motion platform 12 carries a pair of NDI scanners 14a and 14b including respective 1-D sensor arrays having centerlines which are oriented mutually parallel and separated by a fixed distance d. As the motion platform 12 translates across the surface 31, the NDI scanners 14a and 14b are activated to concurrently acquire NDI sensor data containing information concerning respective underlying subsurface structures of the target object 30. That NDI sensor data is converted into respective sequences of scan strips, which sequences of scan strips may be aggregated to construct a pair of partially overlapping scan images 42a and 42b. In the example depicted in FIG. 9, the NDI scanner 14a includes the leading 1-D sensor array, whereas the NDI scanner 14b includes the trailing 1-D sensor array. Scan image 42a is derived from the sensor data acquired by NDI scanner 14a; scan image 42b is derived from the sensor data acquired by NDI scanner 14b. As indicated in FIG. 9, the scan images 42a and 42b encompass respective areas on the surface 31 having a length D in the X direction. In order to ensure that the scan images 42a and 42b partially overlap, the condition d<D must be satisfied.

During translation of motion platform 12, the NDI scanners 14a and 14b pass over the same portion of the target object 30, but at different times. As a result, any common virtual features appearing in the scan images, corresponding to the structural features in that same portion of the target object 30, will have different positions within the respective image frames. The feature point alignment technique may be used to determine the difference in the respective positions of the common feature point in the manner previously described herein. From this imaged position difference, the change in position of the motion platform—namely, the platform displacement from the platform position where the first NDI scanner 14 imaged a particular structural feature to the subsequent platform position where the second NDI scanner 14b imaged the same structural feature—can be computed. More specifically, the change in position of the motion platform 12 may be determined using the image pair comparison technique. That relative change in position may then be used to compute the absolute position of the motion platform 12 (and the absolute positions of the NDI scanners 14a and 14b).

In accordance with one embodiment, the location of the motion platform 12 on surface 31 is tracked while the NDI scanners 14a and 14b are translating in tandem across the surface 31 of target object 30 in the X direction at a known speed. During this translation, the NDI scanner 14a moves from a first X position to a third X position while the NDI scanner 14b moves from a second X position to a fourth X position, wherein the second X position is between the first and third X positions, and the third X position is between the second and fourth positions. During translation in tandem, the NDI scanner 14a is operated to acquire a first sequence of sets of sensor data at a known capture rate as the NDI scanner 14a moves from the first X position to the third X position, whereas the NDI scanner 14b is operated to acquire a second sequence of sets of sensor data at the known capture rate as the NDI scanner 14b moves from the second X position to the fourth X position. The first sequence of sets of sensor data are converted to a corresponding first sequence of scan strips of scan image data, whereas the second sequence of sets of sensor data are converted to a corresponding second sequence of scan strips of scan image data. The number of scan strips in the second sequence is the same as a number of scan strips in the first sequence. Furthermore, the image processor 15 (not shown in FIG. 9) constructs the scan image 42a from the first sequence of scan strips and the scan image 42b from the second sequence of scan strips. Then the image processor 15 finds feature points in the first and second scan images 42a and 42b and determines which feature points found in the first and second scan images 42a and 42b are common feature points. The common features visible in the scan images 42a and 42b represent structural features of the target object. The image processor 15 then computes a scanner displacement by multiplying a pixel position difference between the respective positions of the common feature points in the first and second scan images times a scaling factor representing a distance traveled by the first and second scanners per scan strip. In accordance with one proposed implementation, the pixel position difference is computed by counting a number of pixel columns by which the position of a common feature point in the second scan image 42b is offset from the position of the common feature point in the first scan image 42a. The NDI sensor data processor 20 is configured to associate respective time stamps with the scan strips of scan image data to mark when the corresponding set of sensor data was captured. The image processor 15, is further configured to compute an estimated speed of the motion platform based on the fixed (known) distance between NDI sensor scans and a time interval having a duration equal to a difference between a time stamp associated with a scan strip of the first sequence of scan strips in which the common feature appears and a time stamp associated with a scan strip of the second sequence of scan strips in which the common feature appears; and compute the scaling factor by dividing the estimated speed by the known capture rate.

Figure 10:
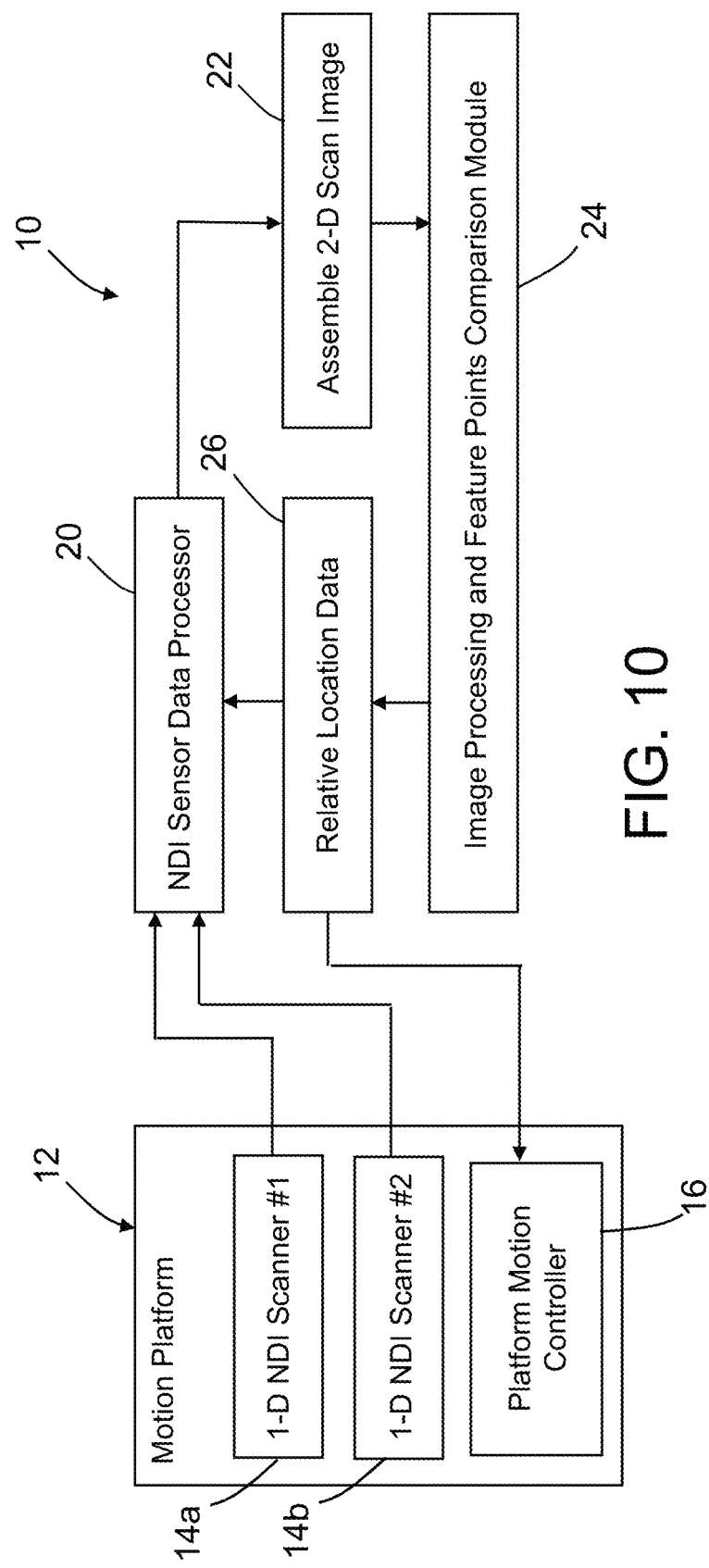
FIG. 10 is a block diagram identifying some components of a system for tracking the locations of a pair of spaced-apart NDI scanners mounted to a motorized motion platform in accordance with one embodiment.

FIG. 10 is a block diagram identifying some components of a system 10 for tracking the location of a motorized motion platform 12 carrying a pair of spaced-apart NDI scanners 14a and 14b in accordance with one embodiment. The movements of the motion platform 12 are controlled by an onboard platform motion controller 16 so that the NDI scanners 14a and 14b follows a pre-planned scan path on the target object. During translation, the NDI scanners 14a and 14b may be continually activated to acquire sensor data containing information regarding structural features of the target object. The system 10 partly depicted in FIG. 10 further includes an NDI sensor data processor 20 that is configured to convert sensor data output by the NDI scanners 14a and 14b to respective sequences of scan strips. The resulting scan strip sequences are is fed to a composite scan image construction module 22 which assembles sequences of scan strips to form individual 2-D scan images which are partially overlapping. The image processing and feature point comparison module 24 executes the image pair comparison algorithm (described above). The image processing and feature point comparison module 24 is further configured to compute a change in location of the motion platform 12 relative to a previous location based on the respective positions of respective common feature points in the partially overlapping scan images. This relative physical distance is then added to the prior absolute location estimate to get the new (current) absolute location. The absolute location estimate is then used by the platform motion controller 16 to control the motion of the motion platform 12 in accordance with the pre-planned scan path. Optionally (as depicted in FIG. 10), the relative location data 26 is also sent to the NDI sensor data processor 20, where it may be used to construct a composite scan image.

Figure 11:
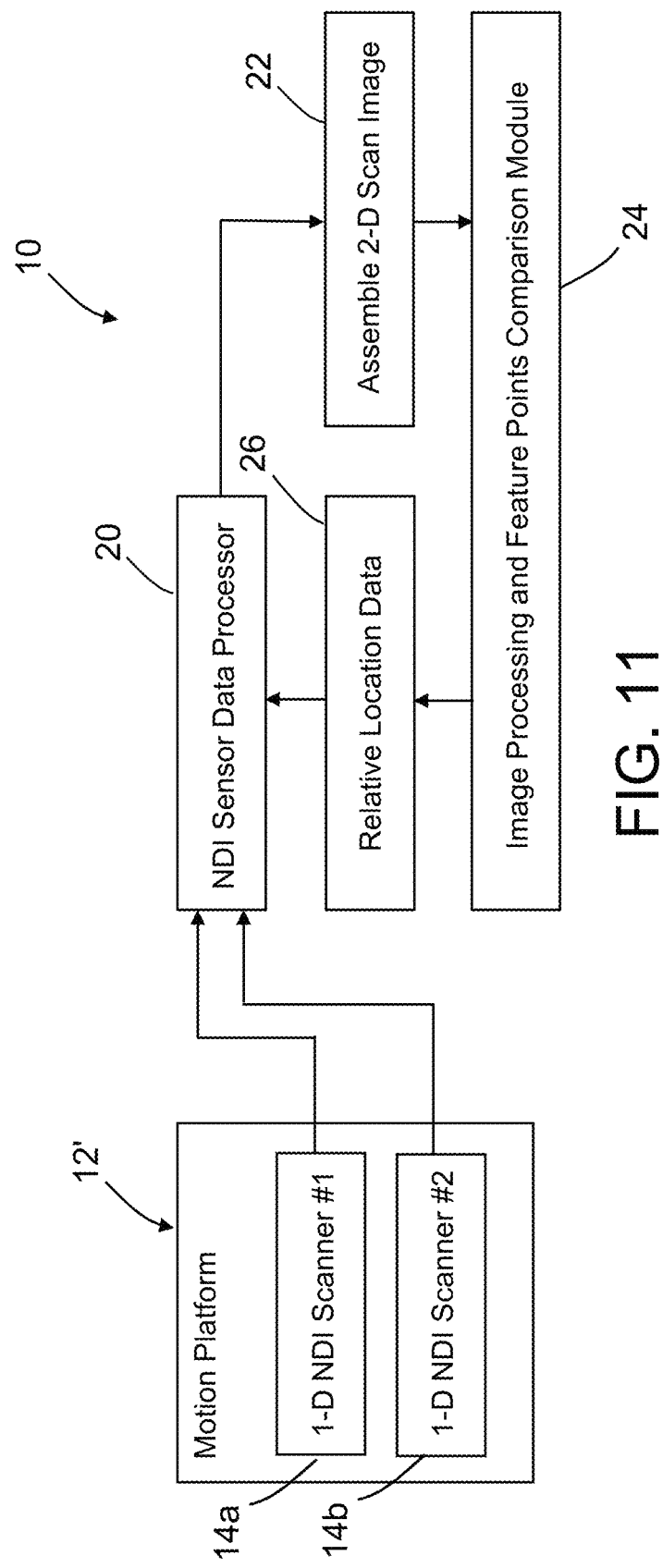
FIG. 11 is a block diagram identifying some components of a system for tracking the locations of a pair of spaced-apart NDI scanners mounted to a manually movable motion platform in accordance with an alternative embodiment.

FIG. 11 is a block diagram identifying some components of a system 10 for tracking the locations of a pair of spaced-apart NDI scanners 14a and 14b mounted to a manually movable motion platform 12' in accordance with an alternative embodiment. The image processing modules 22 and 24 have the same configurations as previously described to enable tracking of the absolute location of the manually movable motion platform 12' in the frame of reference of a target object. The major difference between the systems partly depicted in FIGS. 10 and 11 is that system 10 in FIG. 11 does not have a platform motion controller. Instead the motion platform 12' is configured with a handle to enable an inspection technician to move the motion platform 12' manually.

In accordance with other embodiments, the system includes a motion platform comprising a frame, a single 1-D sensor array mounted on a controllable motion element (such as a motorized guide rail attached to the frame) that enables the 1-D sensor element to move relative to the frame, and a computer system communicatively coupled to receive sensor data from the 1-D sensor array. The employment of a single 1-D sensor array that is movable relative to the motion platform 12 avoids the wheel slippage problem and also addresses hand-held motion configurations. The motion platform may be either manually movable (hand-held) or motorized (automated). The motion platform does not move while the controllable motion element moves the 1-D sensor array over the surface during NDI data collection. Once the controllable motion element completes a scan, the motion platform is moved to a new location that partially overlaps with the prior location.

Figure 12:
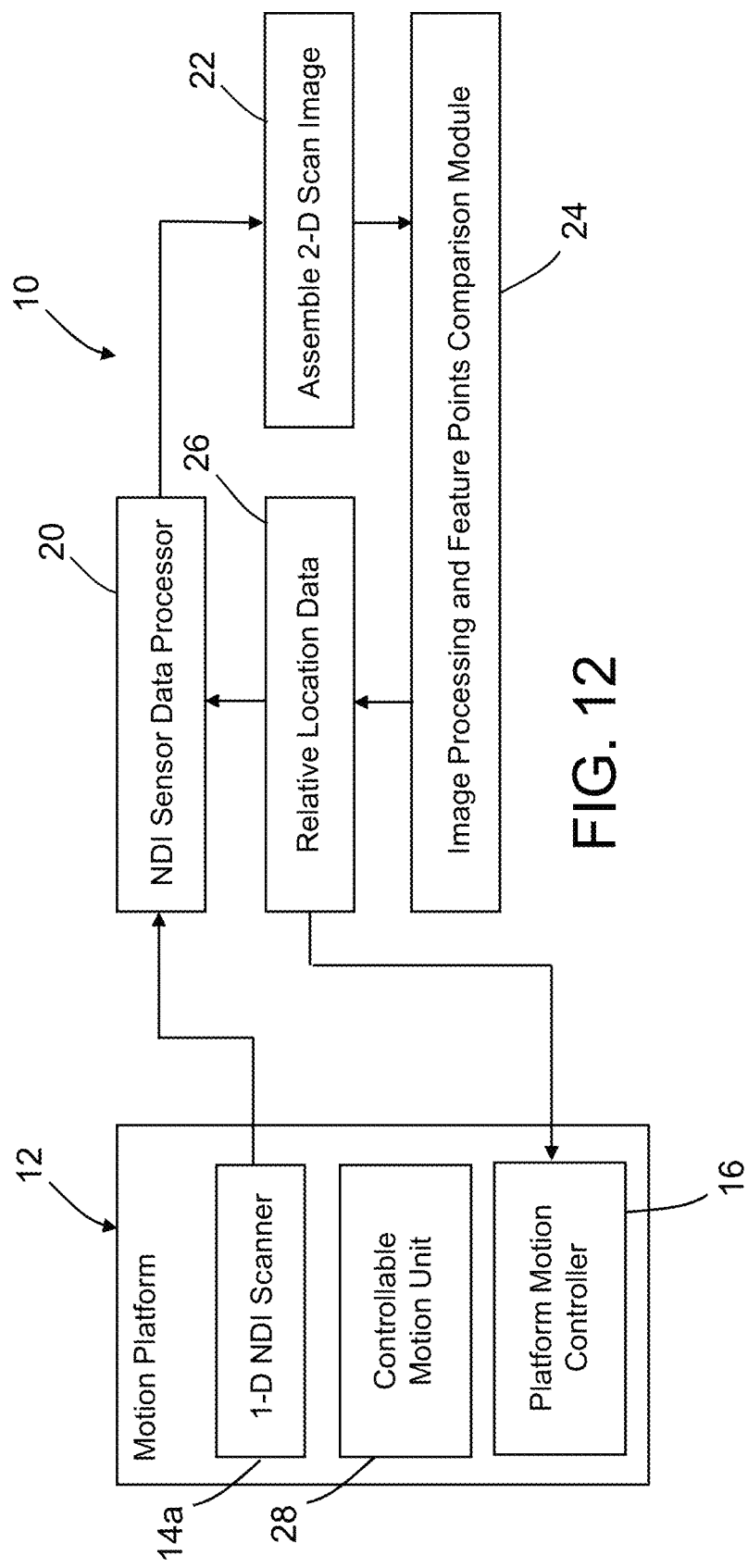
FIG. 12 is a block diagram identifying some components of a system for tracking the location of an NDI scanner including a 1-D sensor array which is displaceable relative to a motorized motion platform in accordance with another embodiment.

FIG. 12 is a block diagram identifying some components of a system 10 for tracking the location of an NDI scanner 14 including a 1-D sensor array which is displaceable relative to a motorized motion platform 12 in accordance with one embodiment. The movements of the motion platform 12 are controlled by an onboard platform motion controller 16 The movements of the NDI scanner 14 relative to the motion platform 12 are controlled by an onboard controllable motion unit 28. The platform motion controller 16 is configured to follow a pre-planned scan path on the target object while stopping periodically. During the stoppages, the controllable motion unit 28 activates mechanisms which translate the NDI scanner 14 relative to a frame of the motion platform 12. For example, after the motion platform 12 has translated a preset distance in the X direction and then stopped, the NDI scanner 14 may be moved across the surface of the target object in the X direction while the motion platform 12 remains stationary. Upon completion of the scan of a confronting area of the surface of the target object, the NDI scanner 14 is stopped. Then the motion platform 12 is again translated the preset distance in the X direction and the scanning process is repeated until sufficient information regarding structural features of the target object has been acquired. The image processing modules 22 and 24 have the same configurations as previously described to enable tracking of the absolute location of the motion platform 12 in the frame of reference of a target object.

Figure 13:
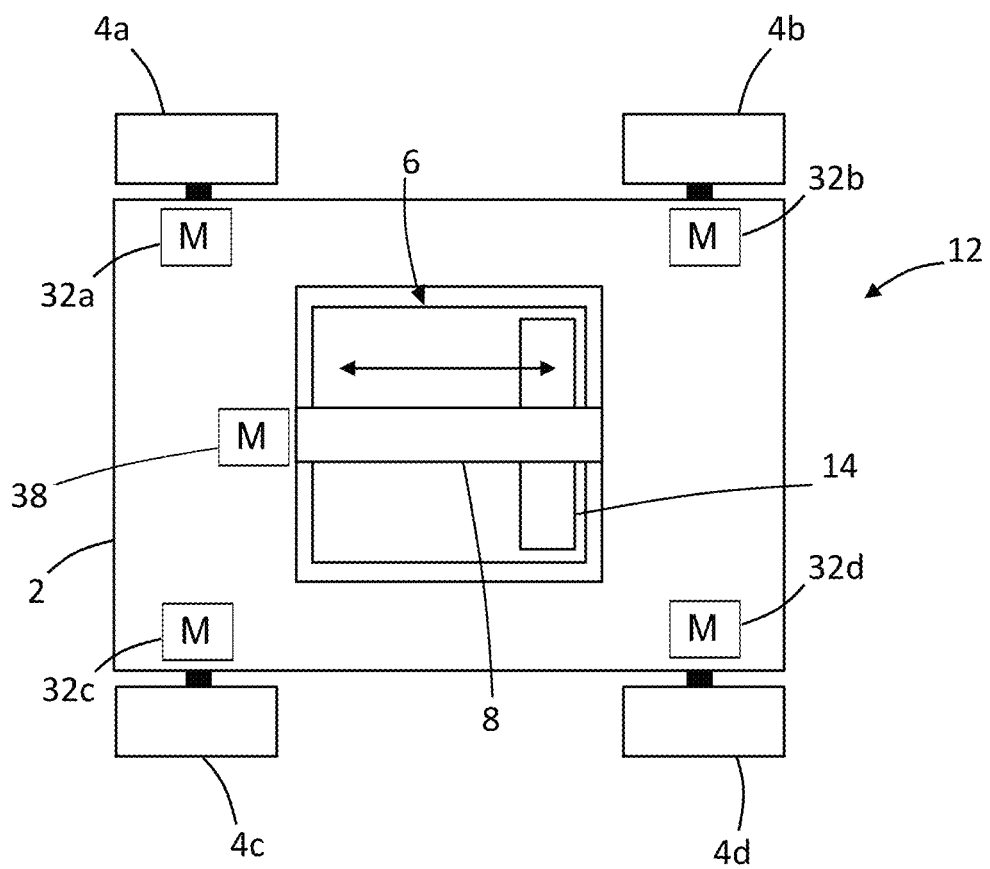
FIG. 13 is a diagram representing a top view of a motorized motion platform that includes a frame, wheels rotatably coupled to the frame, a linear guide rail fixedly coupled to the frame and a 1-D sensor array slidably coupled to the linear guide rail in accordance with one embodiment.

FIG. 13 is a diagram representing a top view of a motorized motion platform 12 that includes a frame 2 and a plurality of wheels 4a-4d rotatably coupled to the frame 2. The wheels 4a-4d are driven to rotate by respective wheel drive motors 32a-32d which are mounted to the frame 2. The motion platform 12 carries an NDI scanner 14 which is translatable relative to the frame 2. A motion controller (not shown in FIG. 13, but see controllable motion unit 28 in FIG. 12) is configured to enable translation of the NDI scanner 14 relative to the frame 2 independent of the translation of the motion platform 12, which is under the control of the platform motion controller 16 (see FIG. 12). More specifically, the controllable motion unit 28 is configured to control the motor so that the one-dimensional sensor array moves relative to the frame in a direction parallel to the linear guide rail 8.

One proposed implementation of an electro-mechanical subsystem for enabling the NDI scanner 14 to translate relative to the frame 2 of motion platform 12 includes a linear guide rail 8 (hereinafter "guide rail 8") that spans an opening 6 in the frame 2, the opposing ends of guide rail 8 being fixedly coupled to the frame 2. The NDI scanner 14 is driven to translate along guide rail 8 in either direction (indicated by a double-headed arrow in FIG. 13) by a motor 38 which is mounted to the frame 2. The NDI scanner 14 includes a 1-D sensor array that is slidably coupled and oriented perpendicular to guide rail 8. The 1-D sensor array comprises a multiplicity of sensors which are mutually aligned to form a linear array. The opening 6 overlies an area to be scanned by the 1-D sensor array as the NDI scanner 14 translates from one end of the opening 6 to the other end.

Figure 14:
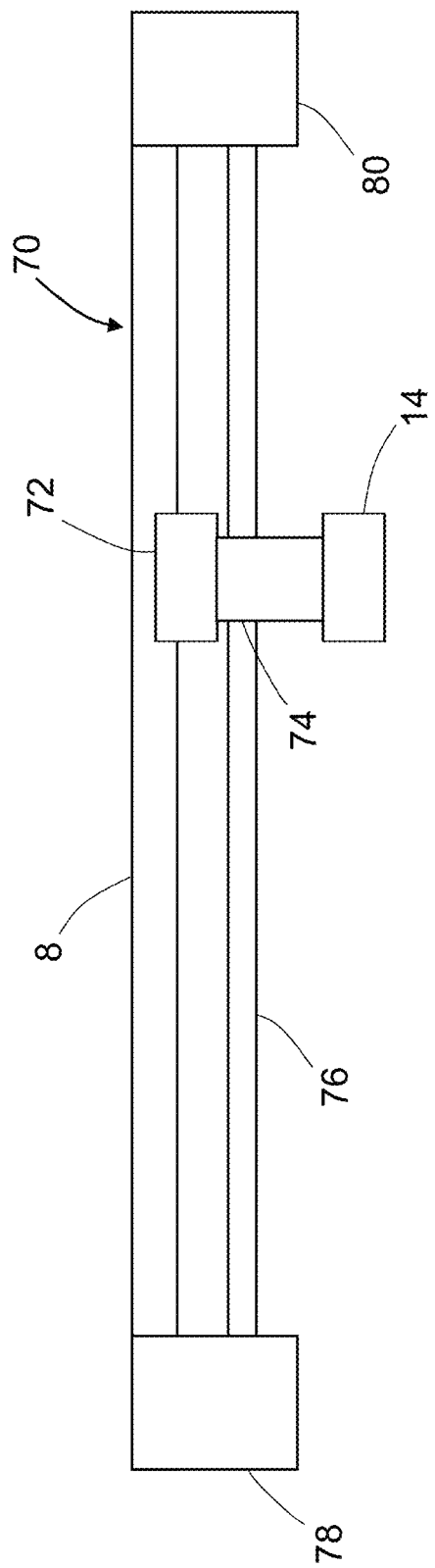
FIG. 14 is a diagram representing a side view of some components of a motorized motion platform that enable a 1-D sensor array to displace relative to a frame of the platform in accordance with one proposed implementation.

FIG. 14 is a diagram representing a side view of some components of an electro-mechanical subsystem 70 that enable the NDI scanner 14 to translate along guide rail 8. The electro-mechanical subsystem 70 includes a bearing guide 72 that is slidably coupled to guide rail 8 and a drive mechanism that mechanically couples the carriage 74 to the motor 38 (see FIG. 13) to cause bearing guide 72 to slide along guide rail 8 during operation of motor 38. The NDI scanner 14 is attached (fixedly coupled) to the carriage 74, having a dependent configuration that enables the 1-D sensor array of NDI scanner 14 to interrogate a confronting surface area underlying the opening 6 in frame 2 (see FIG. 13).

The electro-mechanical subsystem 70 further includes a lead screw 76 and a nut (within carriage 74) that the threadably engages the lead screw 76. The nut is installed inside a cavity formed in the carriage 74. The coupling of carriage 74 to the lead screw 76 by means of the nut enables the carriage 74 to translate (by sliding) along the guide rail 8 when the lead screw 76 is driven to rotate by motor 38. The opposing ends of lead screw 76 are supported by respective bearings 78 and 80. Rotation of lead screw 76 may be driven by motor 38 via a belt (not shown) which circulates on respective pulleys. In other embodiments, the lead screw could be driven directly by the motor. Other options include gear drive or chain drive. The electro-mechanical subsystem 70 further includes a bearing guide 72 to which the carriage 74 is attached. The bearing guide 72 comprises a series of recirculating ball bearings, the balls of which roll along the guide rail 8. Optionally, the position of the carriage 74 along the guide rail 8 can be measured by a position sensor (e.g., a rotation encoder coupled to the lead screw 76) to provide position feedback to the controllable motion unit 28.

Figure 15:
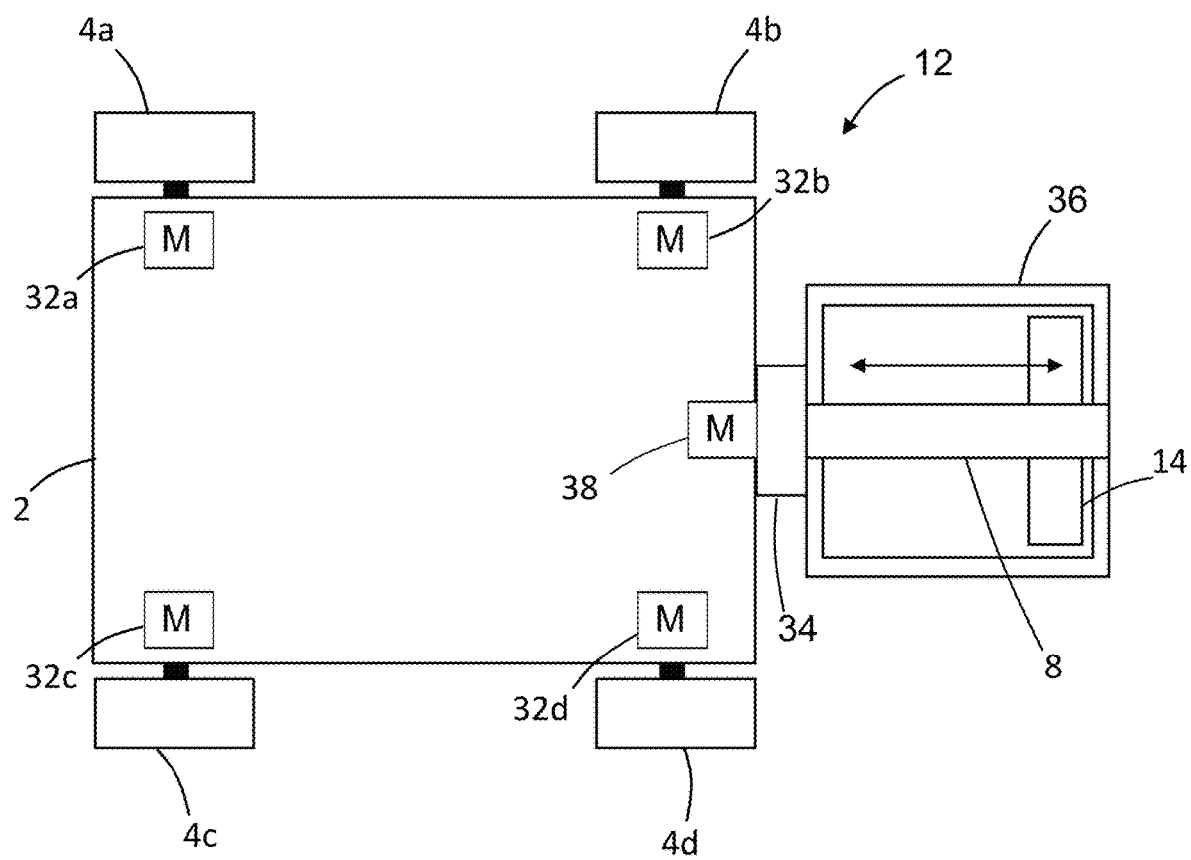
FIG. 15 is a diagram representing a top view of a motorized motion platform that includes a frame, wheels rotatably coupled to the frame, a linear guide rail fixedly coupled to the frame and a 1-D sensor array slidably coupled to the linear guide rail in accordance with an alternative embodiment.

FIG. 15 is a diagram representing a top view of a motorized motion platform 12 that includes a frame 2, wheels 4a-4d rotatably coupled to the frame 2, a linear guide rail 8 fixedly coupled to the frame 2 and an NDI scanner 14 comprising a 1-D sensor array slidably coupled to guide rail 8 in accordance with an alternative embodiment. This embodiment differs from the embodiment depicted in FIG. 14 in that the guide rail 8 and NDI scanner 14 are mounted in front of the frame 2 of motion platform 12 rather overlying an opening 6 in the frame 2. The motion platform 12 depicted in FIG. 15 further includes a rectangular extension frame 36 fixedly coupled to the forward end of frame 2 by means of a rigid support beam 34. The guide rail 8 spans an opening in rectangular extension frame 36, the opposing ends of guide rail 8 being fixedly coupled to rectangular extension frame 36. The NDI scanner 14 is driven to translate along guide rail 8 in either direction (indicated by a double-headed arrow in FIG. 15) by a motor 38 which is mounted to the frame 2.

Figure 16:
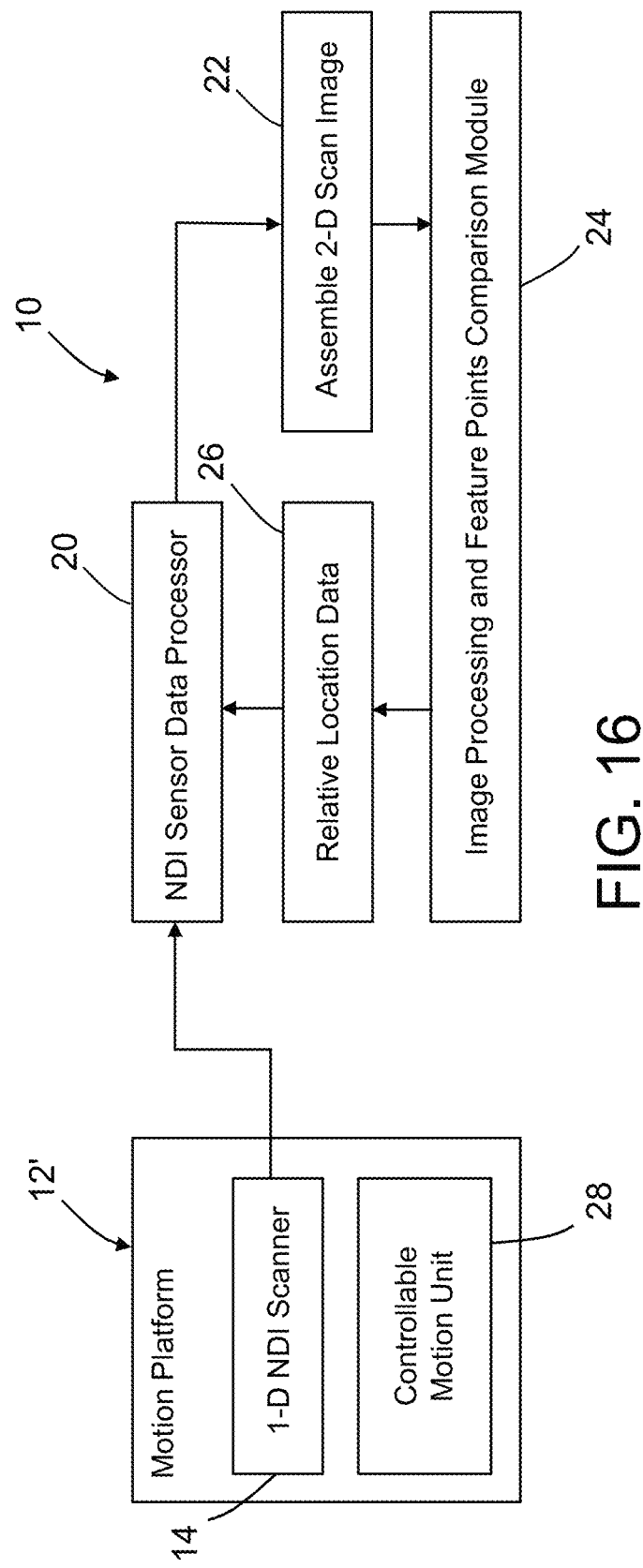
FIG. 16 is a block diagram identifying some components of a system for tracking the location of an NDI scanner including a 1-D sensor array which is displaceable relative to a manually movable motion platform in accordance with an alternative embodiment.

FIG. 16 is a block diagram identifying some components of a system 10 for tracking the location of an NDI scanner 14 including a 1-D sensor array which is displaceable relative to a manually movable motion platform 12' in accordance with an alternative embodiment. The image processing modules 22 and 24 have the same configurations as previously described to enable tracking of the absolute location of the manually movable motion platform 12' in the frame of reference of a target object. The major difference between the systems partly depicted in FIGS. 12 and 16 is that system 10 in FIG. 16 does not have a platform motion controller.

Figure 17:
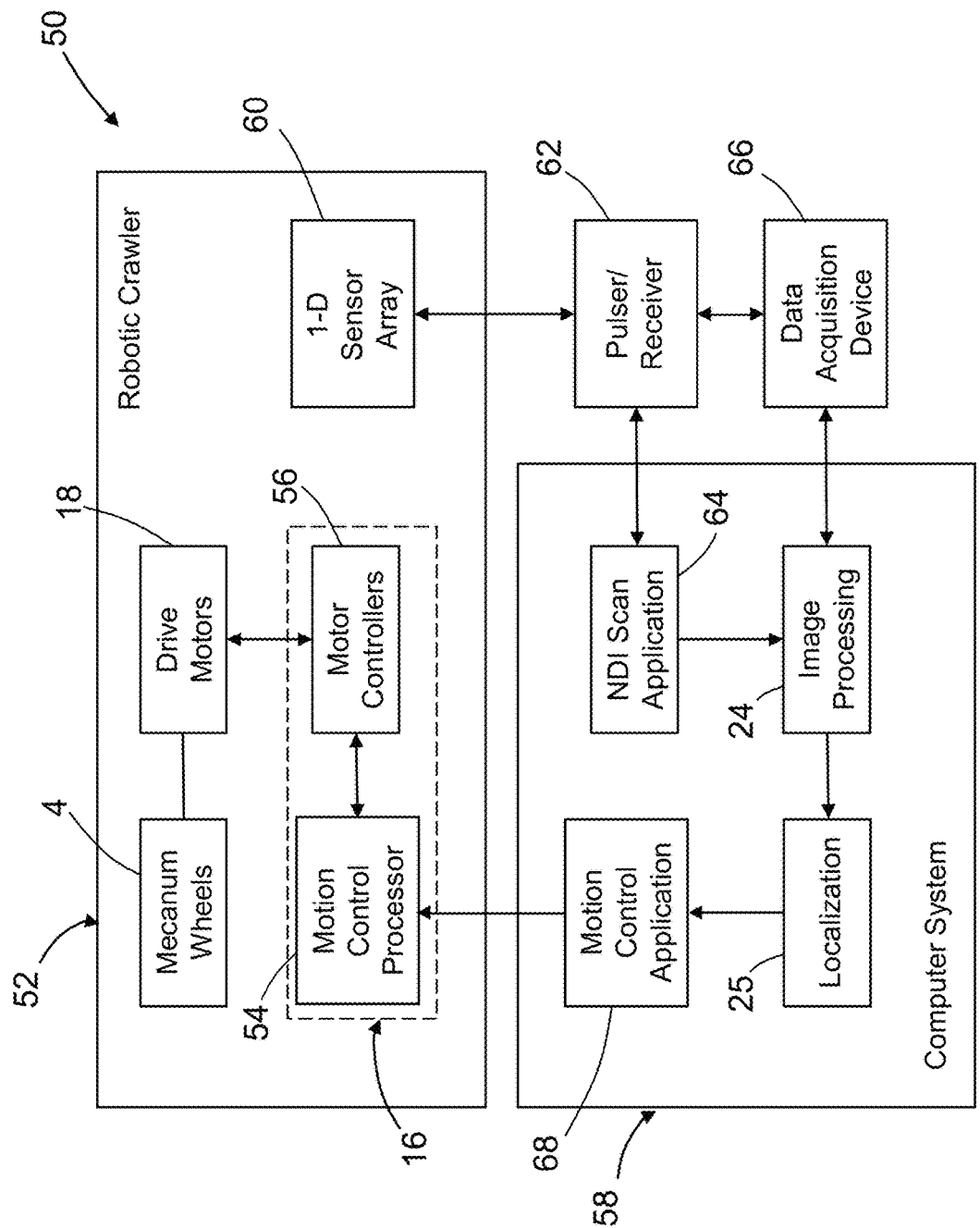
FIG. 17 is a block diagram identifying some components of a system that includes a 1-D sensor array mounted to a robotic crawler vehicle and a computer system configured to control the scanning position of the 1-D sensor array based on images acquired by the 1-D sensor array.

FIG. 17 is a block diagram identifying some components of a system 50 that includes a 1-D sensor array 60 mounted to a Mecanum-wheeled robotic crawler vehicle 52 (hereinafter "crawler vehicle 52") in accordance with one embodiment. The system 50 further includes a computer system 58 configured to control the scanning position of the 1-D sensor array 60 and the acquisition of sensor data by the 1-D sensor array 60. The scanning position is controlled based on common features in scan images derived from the sensor data acquired by the 1-D sensor array 60 from the target object, as previously described herein.

The crawler vehicle 52 includes a motion controller 16 and a multiplicity of Mecanum wheels 4 operatively coupled to respective drive motors 18. The motion controller 16 includes a motion control processor 54 and a multiplicity of motor controllers 56 for independently controlling the drive motors 18 in accordance with control signals received from the motion control processor 54. The motion control processor 54 in turn receives commands from the computer system 58. The computer system 58 may be communicatively coupled to the motion control processor 54 via an electrical cable or wirelessly via transceivers (neither of which are shown in FIG. 17). The computer system 58 uses relative location information to track the relative location (e.g., relative to an initial absolute location acquired using an external position measurement system) of the crawler vehicle 52.

More specifically, the computer system 58 is programmed with NDI scan application software 64 and motion control application software 68. The computer system 58 may comprise a general-purpose computer. The NDI scan application software 64 is configured to control a pulser/receiver 62. In accordance with the architecture depicted in FIG. 17, the pulser/receiver 62 is coupled to provide power and control signals and receive sensor data signals from the 1-D sensor array 60. The pulser/receiver 62 sends pulses to and receives return signals from the 1-D sensor array 60. The NDI scan application software 64 running on computer system 58 controls all details of the image scan data and the display of that data. For example, the 1-D sensor array 60 and pulser/receiver 62 may respectively be a 1-D ultrasonic transducer array and an ultrasonic pulser/receiver unit.

In addition, the computer system 58 hosts the image processing and feature point comparison module 24, which outputs relative location data 26 (see FIG. 1) to a localization module 25. The localization module 25 is configured to convert the relative location data 26 into absolute location data that is useful to the motion control application 68. The motion control application 68 is configured to control the motion of the crawler vehicle 52 to continue to follow the original pre-defined (planned) scan path based on the localization updates received from the localization module 25. In accordance with one embodiment, the motion control application software 68 is configured to control the position of the crawler vehicle 52 in accordance with absolute coordinates output by the localization module 25. The current location of the stopped crawler vehicle 52 may be checked periodically to determine to what extent the current absolute location may deviate from the desired location specified in the scan path plan.

While displays like LCD monitors have fixed pixel spacing, when an NDI scan image is created using a 1-D sensor array, the computer system is configured to determine how far the NDI receiver elements were from each other when the data was acquired. The spacing between the individual sensor elements of the linear array is known, since those are a fixed distance in the array housing, but from one capture of an array's worth of data to the next, the computer system is configured to accurately space the data, which can be done if the velocity of the motion platform and capture rate of the NDI scanner are known. For example assume the motion platform (and the array) is moving from left to right, and the 1-D sensor array is oriented perpendicular to the left-right direction (up-down). The individual NDI element (pixel) spacing is known in the up-down direction, but until the left-right velocity is known, the computer system is unable to determine the pixel column spacing. If the motion platform were moving slowly, the left-right spacing would be smaller than if the motion platform were moving fast. In the event that the X spacing and Y spacing are unequal, the scan image may be represented using one of the following options: (1) accept an image that is not scaled equally in X and Y; or (2) insert space in the scan image between the columns of pixels; or (3) stretch or compress the pixels (making them rectangular instead of square).

In accordance with the teachings herein, corrections can be made to the relative motion measurements by acquiring accurate, absolute measurements at lower update rates. This absolute measurement process (performed while the target object is stopped) can be integrated into a relative motion measurement system running at higher update rates, which acquires relative motion measurements while the target object is moving. In accordance with one embodiment disclosed hereinafter, a lower-update-rate local positioning system-based process provides corrections to a higher-update-rate localization process.

In addition to mapping subsurface features, the absolute position measurements may be used to map the location of surface and subsurface anomalies in the target object. The mapping of the defect size, shape, and depth to a CAD model of the target object will enable finite element analysis of the defect in the structure, analysis of its effects on structural performance, and repair analysis and planning.

A location tracking correction may be performed manually (human-assisted), where a person identifies common known landmarks in CAD model data and NDI scan image data, and forces the estimate to align with the known coordinates. Or the correction process could be automated by using suitably prepared references images. These reference images could be from prior NDI scans where the coordinates of landmarks have already been identified, or the data could come from CAD model data with known coordinates for landmarks.

In accordance with one proposed implementation, the 1-D sensor array takes the form of an array of ultrasonic transducer elements configured to enable the production and display of a C-scan of a small area. Many different ultrasonic transducer element configurations can be employed. For example, the ultrasonic transducer array may comprise an array of transmit/receive electrodes arranged in rows and columns in a pixel-type configuration. In an alternative configuration, the ultrasonic transducer array comprises a set of mutually parallel elongated transmit electrodes which overlap and cross a set of mutually parallel elongated receive electrodes at a non-zero angle. An ultrasonic transducer array can be used to inspect any number of structures in a variety of industries where detection of flaws or anomalies in the structure is required, such as in the aircraft, automotive, marine, or construction industries. The ultrasonic transducer array is capable of detecting any number of flaws or anomalies within or on the surface of the structure, such as impact damage (e.g., delaminations and matrix cracking), disbonds (e.g., airframe/reinforcing members or honeycomb composites), discontinuities, voids, or porosity, which could adversely affect the performance of the structure.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods for tracking the location of an NDI scanner using scan images of the target object have been described with reference to particular embodiments, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore, it is intended that the claims set forth hereinafter not be limited to the disclosed embodiments.

As used herein, the term "computer system" should be construed broadly to encompass a system having at least one computer or processor, and which may have multiple computers or processors that are communicatively coupled by means of a network or bus. As used in the preceding sentence, the terms "computer" and "processor" both refer to devices comprising a processing unit (e.g., a central processing unit) and some form of memory (e.g., non-transitory tangible computer-readable storage medium) for storing a program which is readable by the processing unit. For example, the image processor 15, platform motion controller 16 and NDI sensor data processor 20 identified in FIG. 1 form a "computer system" as defined herein.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A method for tracking a location of a scanner, the method comprising:
   (a) translating a scanner having a one-dimensional sensor array across a surface of a target object in an X direction at a known speed from a first X position to second, third and fourth X positions in succession;
   (b) acquiring successive sets of sensor data at a known capture rate as the scanner translates in the X direction;
   (c) converting the successive sets of sensor data to respective scan strips of scan image data;
   (d) constructing a first scan image from a first sequence of scan strips converted from sensor data acquired during movement of the one-dimensional sensor array from the first X position to the third X position;
   (e) constructing a second scan image from a second sequence of scan strips converted from sensor data acquired during movement of the one-dimensional sensor array from the second X position to the fourth X position;
   (f) finding feature points in the first and second scan images;
   (g) determining which feature points found in step (f) are common feature points in the first and second scan images;
   (h) computing a pixel position difference between the respective positions of the common feature point in the first and second scan images; and
   (i) computing a scanner displacement by multiplying the pixel position difference computed in step (h) times a scaling factor representing a distance traveled by the scanner per scan strip.

2. The method as recited in claim 1, further comprising computing the pixel position difference by counting a number of pixel columns by which the position of the common feature point in the second scan image is offset from the position of the common, feature point in the first scan image.

3. The method as recited in claim 1, further comprising computing the scaling factor by dividing the known speed by the known capture rate.

4. The method as recited in claim 1, further comprising:
   computing an X position coordinate representing an estimate of the second X position in a frame of reference of the target object by adding the scanner displacement distance to an X position coordinate of the first X position; and
   storing the X position coordinate of the second X position in association with the second scan image in a non-transitory tangible computer-readable storage medium.

5. The method as recited in claim 1, further comprising:
   (j) finding a feature point in a scan image representing a structural feature of interest in the target object; and
   (k) calculating an X position coordinate of the structural feature based on an X position coordinate of the one-dimensional sensor array at a time when a scan strip including the feature point was acquired.

6. The method as recited in claim 5, further comprising associating respective time stamps with the scan strips of scan image data to mark when the corresponding set of sensor data was captured.

7. The method as recited in claim 1, further comprising:
   computing successive scanner displacements;
   computing successive X position coordinates corresponding to successive X positions of the scanner following respective scanner displacements; and
   stopping translation of the scanner when the X position coordinate of the scanner equals a limit X position coordinate.

8. A method for tracking a location of a motion platform carrying first and second scanners that respectively comprise first and second one-dimensional sensor arrays which have respective centerlines oriented parallel to a Y direction and separated by a fixed distance, the method comprising:
   (a) translating the motion platform across a surface of a target object in an X direction at a known speed, during which translation the first scanner moves from a first X position to a third X position while the second scanner moves from a second X position to a fourth X position, wherein the second X position is between the first and third X positions, and the third X position is between the second and fourth positions;
   (b) operating the first scanner to acquire a first sequence of sets of sensor data at a known capture rate as the first scanner moves from the first X position to the third X position;
   (c) operating the second scanner to acquire a second sequence of sets of sensor data at the known capture rate as the second scanner moves from the second X position to the fourth X position;
   (d) converting the first sequence of sets of sensor data to a corresponding first sequence of scan strips of scan image data;
   (e) converting the second sequence of sets of sensor data to a corresponding second sequence of scan strips of scan image data, wherein a number of scan strips in the second sequence of scan strips is the same as a number of scan strips in the first sequence of scan strips;
   (f) constructing a first scan image from the first sequence of scan strips;
   (g) constructing a second scan image from the second sequence of scan strips;
   (h) finding feature points in the first and second scan images;

(i) determining which feature points found in step (h) are common feature points in the first and second scan images;
(j) computing a pixel position difference between the respective positions of the common feature point in the first and second scan images; and
(k) computing a scanner displacement by multiplying the pixel position difference computed in step (j) times a scaling factor representing a distance traveled by the first and second scanners per scan strip.

9. The method as recited in claim 8, further comprising computing the pixel position difference by counting a number of pixel columns by which the position of the common feature point in the second scan image is offset from the position of the common feature point in the first scan image.

10. The method as recited in claim 8, further comprising:
associating respective time stamps with the scan strips of scan image data to mark when the corresponding set of sensor data was captured;
computing an estimated speed of the motion platform based on the fixed distance and a time interval having a duration equal to a difference between a first time stamp associated with a scan strip of the first sequence of scan strips in which the common feature appears and a second time stamp associated with a scan strip of the second sequence of scan strips in which the common feature appears; and
computing the scaling factor by dividing the estimated speed by the known capture rate.

11. The method as recited in claim 8, further comprising:
computing an X position coordinate representing an estimate of the second X position in a frame of reference of the target object by adding the scanner displacement distance to an X position coordinate of the first X position; and
storing the X position coordinate of the second X position in association with the second scan image in a non-transitory tangible computer-readable storage medium.

12. The method as recited in claim 8, further comprising:
computing successive scanner displacements;
computing successive X position coordinates corresponding to successive X positions of the scanner following respective scanner displacements; and
stopping translation of the motion platform when the X position coordinate of the scanner equals a limit X position coordinate.

13. A system comprising:
a motorized motion platform comprising a frame;
a scanner comprising a one-dimensional sensor array supported by the frame; and
a computer system communicatively coupled to receive sensor data from the one-dimensional sensor array and send control signals for controlling movement of the motorized motion platform, the computer system being configured to perform operations comprising:
(a) controlling the motorized motion platform to translate the scanner across a surface of a target object in an X direction at a known speed from a first X position to second, third and fourth X positions in succession while the one-dimensional sensor array is oriented in a Y direction;
(b) acquiring successive sets of sensor data at a known capture rate as the scanner translates in the X direction;
(c) converting the successive sets of sensor data to respective scan strips of scan image data;
(d) constructing a first scan image from a first sequence of scan strips converted from sensor data acquired during movement of the one-dimensional sensor array from the first X position to the third X position;
(e) constructing a second scan image from a second sequence of scan strips converted from sensor data acquired during movement of the one-dimensional sensor array from the second X position to the fourth X position;
(f) finding feature points in the first and second scan images;
(g) determining which feature points found in step (f) are common feature points in the first and second scan images;
(h) computing a pixel position difference between the respective positions of the common feature point in the first and second scan images; and
(i) computing a scanner displacement by multiplying the pixel position difference computed in step (h) times a scaling factor representing a distance traveled by the scanner per scan strip.

14. The system as recited in claim 13, wherein the computer system is further configured to compute the pixel position difference by counting a number of pixel columns by which the position of the common feature in the second scan image is offset from the position of the common feature in the first scan image.

15. The system as recited in claim 13, wherein the computer system is further configured to compute the scaling factor by dividing the known speed by the known capture rate.

16. The system as recited in claim 13, further comprising a non-transitory tangible computer-readable storage medium, wherein the computer system is further configured to perform operations comprising:
(j) computing an X position coordinate representing an estimate of the second X position in a frame of reference of the target object by adding the scanner displacement distance to an X position coordinate of the first X position; and
(k) storing the X position coordinate of the second X position in association with the second scan image in the non-transitory tangible computer-readable storage medium.

17. The system as recited in claim 13, wherein the computer system is further configured to perform operations comprising:
computing successive scanner displacements;
computing successive X position coordinates corresponding to successive X positions of the scanner following respective scanner displacements; and
stopping translation of the scanner when the X position coordinate of the scanner equals a limit X position coordinate.

18. A system comprising:
a motion platform comprising a frame;
first and second scanners respectively comprising first and second one-dimensional sensor arrays having respective centerlines which are oriented parallel and separated by a fixed distance; and
a computer system communicatively coupled to receive sensor data from the first and second one-dimensional sensor arrays and configured to perform operations comprising:
(a) operating the first scanner to acquire a first sequence of sets of sensor data at a known capture rate as the first scanner moves from a first X position to a third X position;

(b) operating the second scanner to acquire a second sequence of sets of sensor data at the known capture rate as the second scanner moves from a second X position to a fourth X position, wherein the second X position is between the first and third X positions, and the third X position is between the second and fourth positions;

(c) converting the first sequence of sets of sensor data to a corresponding first sequence of scan strips of scan image data;

(d) converting the second sequence of sets of sensor data to a corresponding second sequence of scan strips of scan image data, wherein a number of scan strips in the second sequence of scan strips is the same as a number of scan strips in the first sequence of scan strips;

(e) constructing a first scan image from the first sequence of scan strips;

(f) constructing a second scan image from the second sequence of scan strips;

(g) finding feature points in the first and second scan images;

(h) determining which feature points found in step (g) are common feature points in the first and second scan images;

(i) computing a pixel position difference between the respective positions of the common feature point in the first and second scan images; and (j) computing a scanner displacement by multiplying the pixel position difference computed in step (i) times a scaling factor representing a distance traveled by the scanner per scan strip.

19. The system as recited in claim 18, wherein the computer system is further configured to compute the pixel position difference by counting a number of pixel columns by which the position of the common feature in the second scan image is offset from the position of the common feature in the first scan image.

20. The system as recited in claim 18, wherein the computer system is further configured to perform operations comprising:

associating respective time stamps with the scan strips of scan image data to mark when the corresponding set of sensor data was captured;

computing an estimated speed of the motion platform based on the fixed distance and a time interval having a duration equal to a difference between a first time stamp associated with a scan strip of the first sequence of scan strips in which the common feature appears and a second time stamp associated with a scan strip of the second sequence of scan strips in which the common feature appears; and computing the scaling factor by dividing the estimated speed by the known capture rate.

\* \* \* \* \*